United States Patent [19]

Saito et al.

[11] Patent Number: 5,103,370
[45] Date of Patent: Apr. 7, 1992

[54] SOLID DIELECTRIC CAPACITOR AND METHOD OF MANUFACTURE

[75] Inventors: Hiroshi Saito, Harunamachi; Mutsumi Honda, Takasaki; Hiroshi Kishi, Fujioka; Hisamitsu Shizuno; Hirokazu Chazono, both of Takasaki, all of Japan

[73] Assignee: Taiyo Yuden Co., Ltd., Tokyo, Japan

[21] Appl. No.: 620,834

[22] Filed: Nov. 29, 1990

[30] Foreign Application Priority Data

Dec. 4, 1989 [JP] Japan ................................. 1-314754
Dec. 5, 1989 [JP] Japan ................................. 1-315981

[51] Int. Cl.$^5$ .................. C04B 35/46; H01G 4/12; H01G 4/10
[52] U.S. Cl. .................. 361/321; 29/25.42; 501/137
[58] Field of Search ............... 29/25.42; 501/134–137; 361/320, 321

[56] References Cited

U.S. PATENT DOCUMENTS

| | | | |
|---|---|---|---|
| 4,610,968 | 9/1986 | Wada et al. | 501/137 |
| 4,610,969 | 9/1986 | Wada et al. | 501/137 |
| 4,610,970 | 9/1986 | Wada et al. | 501/137 |
| 4,610,971 | 9/1986 | Wada et al. | 501/137 |
| 4,999,738 | 3/1991 | Kishi et al. | 361/321 |
| 5,006,955 | 4/1991 | Kishi et al. | 361/321 |

*Primary Examiner*—Donald A. Griffin
*Attorney, Agent, or Firm*—Woodcock Washburn Kurtz Mackiewicz & Norris

[57] ABSTRACT

A monolithic capacitor having a dielectric ceramic body cosintered with at least two base metal electrodes. The ceramic body is composed of a major ingredient expressed by the formula $$(1-\alpha)\{(Ba_{k-x}M_x)O_k(Ti_{1-y}R_y)O_{2-(y/2)}\} + \alpha CaZrO_3$$

where M is either or both of magnesium and zinc, R is a rare earth element or elements, and $\alpha$, k, x and y are numerals in specified ranges. To this major ingredient is added a minor proportion of a first additive ingredient and a second additive ingredient. The first additive ingredient is at least either of chromium oxide and aluminum oxide. The second additive ingredient is a mixture of boric oxide or lithium oxide, silicon dioxide and at least one metal oxide selected from among barium oxide, strontium oxide, calcium oxide, magnesium oxide and zinc oxide. For the fabrication of capacitors the mixture of the above major ingredient and additives in finely divided form are formed into moldings of desired shape and size, each with at least two electrodes buried therein. The moldings and electrodes are cosintered in a reductive or neutral atmosphere at temperatures of less than 1200 degrees C. and then are heated at a lower temperature in an oxidative atmosphere.

11 Claims, 2 Drawing Sheets

SOLID DIELECTRIC CAPACITOR AND METHOD OF MANUFACTURE

BACKGROUND OF THE INVENTION

Our invention relates to solid dielectric capacitors and more particularly to a monolithic ceramic capacitor comprising a single or multiple layered ceramic body and at least two electrodes in contact therewith. The invention also pertains to a method of fabrication such capacitors.

Multilayered ceramic capacitors have long been known and used extensively which employ noble metals such as platinum and palladium as the electrode materials. Generally, for the fabrication of such capacitors, "green" (unsintered) dielectric sheets have first been prepared from the proportioned ingredients of a desired dielectric ceramic material in finely divided form. An electroconductive paste containing powdered platinum or palladium has then been "printed" on the green sheets in a desired pattern. Then a plurality of such printed green sheets have been stacked up, pressed together, and sintered in a temperature range of 1300 degrees to 1600 degrees C. in an oxidative atmosphere.

This conventional method makes possible the simultaneous firing (cosintering) of the dielectric ceramic layers and the film electrodes interleaved therewith. It is also an acknowledged advantage of this known method that the noble metal electrodes are totally unaffected by the high temperature sintering in an oxidative atmosphere. Offsetting all such advantages is the expensiveness of the noble metals, which add substantially to the manufacturing costs of the multilayered ceramic capacitors.

Wada et al. U.S. Pat. No. 4,610,969, assigned to the assignee of the instant application, suggests a solution to the above problem. It teaches dielectric ceramic compositions consisting of a major ingredient expressed by the formula, $(Ba_{k-x}M_x)O_kTiO_2$, where M is at least either of magnesium (Mg) and zinc (Zn), and additives consisting of lithium oxide ($Li_2O$) and silicon dioxide ($SiO_2$). The compositions may, or may not, additionally include at least one metal oxide selected from among barium oxide (BaO), calcium oxide (CaO) and strontium oxide (SrO).

Another solution is found in Wada et al. U.S. Pat. No. 4,610,970, which proposes ceramic compositions whose major ingredient is expressed by the formula, $(Ba_{k-x-y}M_xL_y)O_kTiO_2$, where M is at least either of Mg and Zn, and L is at least either of Sr and Ca. To this major ingredient are added $Li_2O$, $SiO_2$ and, optionally, at least one other metal oxide selected from among BaO, CaO and SrO.

Wada et al. U.S. Pat. No. 4,610,971 suggests still another solution, teaching use of a major ingredient expressed by the formula, $(Ba_{k-x}M_x)O_xTiO_2$, where M is at least one of Mg, Zn, Sr and Ca. This major ingredient is admixed with boric oxide ($B_2O_3$), $SiO_2$ and, optionally, at least one other metal oxide selected from among BaO, MgO, ZnO, SrO and CaO.

A further solution is found in Wada et al. U.S. Pat. No. 4,610,968, which proposes ceramic compositions including a major ingredient expressed by the formula, $(Ba_{k-x}M_x)O_xTiO_2$, where M is at least one of Mg, Zn, Sr and Ca. This major ingredient is admixed with $B_2O_3$ and at least one metal oxide selected from among BaO, MgO, ZnO, SrO and CaO.

All the foregoing known compositions make possible the fabrication of ceramic bodies by firing at temperatures of not more than 1200 degrees C. in a nonoxidative (reductive or neutral) atmosphere. The ceramic bodies may therefore be cosintered with electrodes of a base metal such as nickel. The resulting capacitors have specific dielectric constants of not less than 2000, and the temperature dependences of their capacitances are within plus or minus 10 percent in a temperature range of −25 degrees to +85 degrees C.

While these values are satisfactory for all practical purposes, we have nevertheless been hard pressed by our customers, with the recent development of microelectronics, for ceramic capacitors that have higher specific dielectric constants with no less temperature dependences.

SUMMARY OF THE INVENTION

We have hereby invented how to manufacture ceramic capacitors that have higher dielectric constants, with less temperature dependences over a wide temperature range, than heretofore and which can be formed by firing in a temperature range of not more than 1200 degrees C. in a nonoxidative atmosphere.

Briefly stated in one aspect thereof, our invention provides a solid dielectric capacitor of the above improved characteristics, comprising a low temperature sintered dielectric ceramic body and at least two electrodes in contact therewith. The ceramic body consists essentially of 100 parts by weight of a major ingredient that is expressed by the formula, $(1-\alpha)\{(Ba_{k-x}M_x)O_k(Ti_{1-y}R_y)O_{2-(y/2)}\} + \alpha CaZrO_3$, greater than 0 and not greater than 3.00 parts by weight of at least one metal oxide (hereinafter referred to as the first additive ingredient) selected from the group of chromium oxide ($Cr_2O_3$) and aluminum oxide ($Al_2O_3$) and 0.2 to 5.0 parts by weight of an additive mixture (hereinafter referred to as the second additive ingredient) of at least two members selected from the group consisting of $B_2O_3$ or $Li_2O$, $SiO_2$ and at least one of BaO, SrO, CaO, MgO and ZnO. In the formula of the major ingredient, M is either or both of magnesium and zinc, R is at least one metal selected from scandium(Sc), yttrium(Y), gadolinium(Gd), dysprosium(Dy), holmium(Ho), erbium(Er), ytterbium(Yb), terbium(Tb), thulium(Tm) and lutetium(Lu), $\alpha$ is a numeral in the range of 0.005 to 0.040, k is a numeral not less than 1.00 and not more than 1.05, x is a numeral not less than 0.01 and not greater than 0.10, and y is a numeral greater than 0 and not greater than 0.04. The relative proportions of $B_2O_3$ or $Li_2O$, $SiO_2$ and at least one selected metal oxide, altogether constituting the additive mixture, will be specified with reference to the ternary diagrams attached hereto.

Another aspect of our invention concerns a method of fabricating the ceramic capacitor having the ceramic body of the above specified composition. The method dictates, first of all, the preparation of a mixture of the above specified major ingredient and additives in finely divided form. This mixture is then molded into a body of desired shape and size, which is provided with at least two electrode portions of an electroconductive material in any convenient manner. Then the moldings with the electrode portions are cosintered in a reductive or neutral atmosphere and is subsequently heated in an oxidative atmosphere.

The dielectric ceramic composition of our invention, set forth in the foregoing, makes it possible to sinter the moldings in a nonoxidative atmosphere at temperatures not exceeding 1200 degrees C. A preferred temperature range for this molding operation is from 1050 degrees to 1200 degrees C. The sintering temperatures of less than 1200 degrees C. enable the use of nickel or like low cost base metal as the electrode material in consintering the ceramic boy and the electrodes.

Therefore, in the fabrication of ceramic capacitors by the method of our invention, an electroconductive paste of powdered nickel or like base metal may be printed, coated, or otherwise formed on green sheets of the dielectric ceramic compositions in accordance with our invention. The green sheets and the electroconductive layers thereon may be cosintered at temperatures of not more than 1200 degrees C.

The ceramic capacitors of our invention have proved to have very favorable physical and performance characteristics. The test capacitors manufactured in accordance with our invention, to be disclosed subsequently, had specific dielectric constants of more than 3000, dielectric losses of not more than 2.5%, and resistivities of not less than $1 \times 10^6$ megohm-centimeters. Also the temperature dependences of their specific dielectric constants were from $-15\%$ to $+15\%$ of the value at 25 degrees C. in a temperature range of $-55$ degrees to $+125$ degrees C., and from $-10\%$ to $+10\%$ of the value at 20 degrees C. in a temperature range of $-25$ degrees to $+85$ degrees C.

The above and other features and advantages of our invention and the manner of realizing them will become more apparent, and the invention itself will best be understood, from a study of the following description and appended claims taken together with the attached drawings.

DETAILED DESCRIPTION

Figure 1:
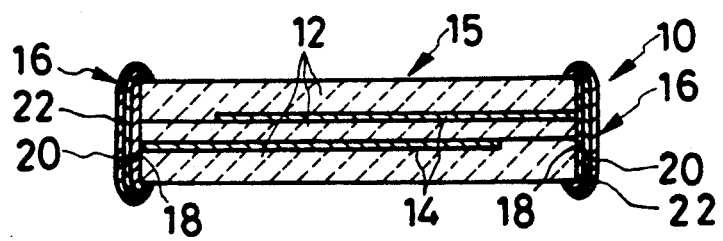
FIG. 1 is a section through a monolithic, multilayered ceramic capacitor capable of fabrication in accordance with the teaching of our invention, the illustrated capacitor being representative of numerous test capacitors manufactured in the Examples of our invention to be presented subsequently.

We have illustrated in FIG. 1 one of many monolithic ceramic capacitors of like construction fabricated in the subsequent Examples of our invention by way of a preferable embodiment thereof. Generally designated 10, the representative capacitor is shown to have an interlamination of three dielectric ceramic layers 12 and two film electrodes 14. The three ceramic layers 12 constitute in combination a solid dielectric body 15 having the low temperature sinterable ceramic compositions in accordance with our invention. The two film electrodes 14, which can be of a low cost base metal such as nickel, extend from both sides of the dielectric body 15 toward, and terminate short of, the opposite sides of the dielectric body and so have an overlapping, parallel spaced relation to each other.

The capacitor 10 also includes a pair of conductive terminations 16 which are formed on both sides of the dielectric body 15 and which contact the respective film electrodes 14. Each termination 16 is shown to comprise a baked on zinc layer 18, a plated on copper layer 20, and a plated on solder layer 22.

Typically, and as fabricated in the subsequent Examples of our invention, the intermediate one of the three dielectric layers 12 has a thickness of 0.02 millimeter (mm). The area of that part of each film electrode 14 which overlaps the other film electrode is 25 mm² (5×5 mm).

EXAMPLES

We fabricated 125 different sets of test capacitors, each constructed as shown in FIG. 1, some having their dielectric bodies formulated in accordance with the ceramic compositions of our invention and others not. Then we measured the specific dielectric constant, dielectric loss, resistivity, and temperature dependence of capacitance of the test capacitors. Tables 1, 2 and 3 list the compositions of the dielectric bodies of all the test capacitors fabricated.

We have previously defined the major ingredient of the ceramic compositions in accordance with our invention by the general formula,

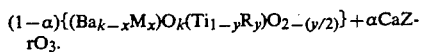

$$(1-\alpha)\{(Ba_{k-x}M_x)O_k(Ti_{1-y}R_y)O_{2-(y/2)}\} + \alpha CaZrO_3.$$

Thus, in Table 1, we have given various combinations of $(1-\alpha)$, $\alpha$, $(k-x)$ and $x$ in the formula to indicate the specific major ingredients employed in the various Tests. The $(1-\alpha)$ and $\alpha$ indicate the relative proportions of $\{(Ba_{k-x}M_x)O_k(Ti_{1-y}R_y)O_{2-(y/2)}\}$ and $CaZrO_3$ of the major ingredient in moles. The $(k-x)$ and x indicate the atomicities of the associated elements. Since M can be either or both of Mg and Zn, the column under X is subdivided into the atomicities of these elements and their sum (X).

In Table 2, we have given various combinations of y and k in the formula to indicate the specific major ingredients employed in the various Tests. Since R is at least one metal selected from Sc, Y, Gd, Dy, Ho, Er and Yb, the column under y is subdivided into the atomicities of these elements and their sum(y). The k indicates the atmicity of the element (0).

The ceramic compositions of our invention also include a first additive ingredient consisting of $Cr_2O_3$ and/or $Al_2O_3$. Table 3 specifies the amounts, in parts by weight, of the first additive ingredient with respect to 100 parts by weight of the major ingredient.

The ceramic compositions of our invention furthermore include a second additive ingredient or glass ingredient. The second additive ingredient is a additive mixture of $B_2O_3$, $SiO_2$ and MO or a additive mixture of $Li_2O$, $SiO_2$ and MO. Table 3 specifies the proportions, in parts by weight, of the second additive ingredient with respect to 100 parts by weight of the major ingredient. Also, Table 3 specifies the relative proportions, in mole percent, of the second additive ingredients $B_2O_3$, $Li_2O$, $SiO_2$, and MO. Further, since MO can be any one or more of BaO, MgO, ZnO, SrO and CaO, Table 3 gives the relative proportions, in mole percent, of these metal oxides. In the Table 3, the additives of Tests Nos. 1-100 consist of $Li_2O$, $SiO_2$ and MO, and the additive of Tests Nos. 100-125 consist of $B_2O_3$, $SiO_2$ and MO.

TABLE 1

Ceramic Compositions
Major Ingredient
(100 wt. parts)

| Test No. | 1 − α | α | k − x | Mg | Zn | Sum |
|---|---|---|---|---|---|---|
| 1 | 0.98 | 0.02 | 0.96 | 0.05 | 0.01 | 0.06 |
| 2 | 0.98 | 0.02 | 0.96 | 0.05 | 0.01 | 0.06 |
| 3 | 0.98 | 0.02 | 0.96 | 0.05 | 0.01 | 0.06 |
| 4 | 0.98 | 0.02 | 0.96 | 0.05 | 0.01 | 0.06 |
| 5 | 0.98 | 0.02 | 0.96 | 0.05 | 0.01 | 0.06 |
| 6 | 0.98 | 0.02 | 0.96 | 0.05 | 0.01 | 0.06 |
| 7 | 0.98 | 0.02 | 0.96 | 0.05 | 0.01 | 0.06 |
| 8 | 0.98 | 0.02 | 0.96 | 0.05 | 0.01 | 0.06 |
| 9 | 0.98 | 0.02 | 0.96 | 0.05 | 0.01 | 0.06 |
| 10 | 0.98 | 0.02 | 0.96 | 0.05 | 0.01 | 0.06 |
| 11 | 0.98 | 0.02 | 0.96 | 0.05 | 0.01 | 0.06 |
| 12 | 0.98 | 0.02 | 0.96 | 0.05 | 0.01 | 0.06 |
| 13 | 0.98 | 0.02 | 0.96 | 0.05 | 0.01 | 0.06 |
| 14 | 0.98 | 0.02 | 0.96 | 0.05 | 0.01 | 0.06 |
| 15 | 0.98 | 0.02 | 0.96 | 0.05 | 0.01 | 0.06 |
| 16 | 0.98 | 0.02 | 0.96 | 0.05 | 0.01 | 0.06 |
| 17 | 0.98 | 0.02 | 0.96 | 0.05 | 0.01 | 0.06 |
| 18 | 0.98 | 0.02 | 0.96 | 0.05 | 0.01 | 0.06 |
| 19 | 0.98 | 0.02 | 0.96 | 0.05 | 0.01 | 0.06 |
| 20 | 0.98 | 0.02 | 0.96 | 0.05 | 0.01 | 0.06 |
| 21 | 0.98 | 0.02 | 0.96 | 0.05 | 0.01 | 0.06 |
| 22 | 0.98 | 0.02 | 0.96 | 0.05 | 0.01 | 0.06 |
| 23 | 0.98 | 0.02 | 0.96 | 0.05 | 0.01 | 0.06 |
| 24 | 0.98 | 0.02 | 0.96 | 0.05 | 0.01 | 0.06 |
| 25 | 0.98 | 0.02 | 0.96 | 0.05 | 0.01 | 0.06 |
| 26 | 0.98 | 0.02 | 0.96 | 0.05 | 0.01 | 0.06 |
| 27 | 0.98 | 0.02 | 0.96 | 0.05 | 0.01 | 0.06 |
| 28 | 0.98 | 0.02 | 0.96 | 0.05 | 0.01 | 0.06 |
| 29 | 0.98 | 0.02 | 0.96 | 0.05 | 0.01 | 0.06 |
| 30 | 0.995 | 0.005 | 0.96 | 0.06 | 0.02 | 0.08 |
| 31 | 0.995 | 0.005 | 0.96 | 0.06 | 0.02 | 0.08 |
| 32 | 0.995 | 0.005 | 0.96 | 0.06 | 0.02 | 0.08 |
| 33 | 0.995 | 0.005 | 0.96 | 0.06 | 0.02 | 0.08 |
| 34 | 0.995 | 0.005 | 0.96 | 0.06 | 0.02 | 0.08 |
| 35 | 0.995 | 0.005 | 0.96 | 0.06 | 0.02 | 0.08 |
| 36 | 0.96 | 0.04 | 0.96 | 0.05 | 0.03 | 0.08 |
| 37 | 0.96 | 0.04 | 0.96 | 0.05 | 0.03 | 0.08 |
| 38 | 0.96 | 0.04 | 0.96 | 0.05 | 0.03 | 0.08 |
| 39 | 0.96 | 0.04 | 0.06 | 0.05 | 0.03 | 0.08 |
| 40 | 0.96 | 0.04 | 0.06 | 0.05 | 0.03 | 0.08 |
| 41 | 1 | 0 | 0.91 | 0.05 | 0.05 | 0.1 |
| 42 | 0.995 | 0.005 | 0.91 | 0.05 | 0.05 | 0.1 |
| 43 | 0.98 | 0.02 | 0.91 | 0.05 | 0.05 | 0.1 |
| 44 | 0.96 | 0.04 | 0.91 | 0.05 | 0.05 | 0.1 |
| 45 | 0.95 | 0.05 | 0.91 | 0.05 | 0.05 | 0.1 |
| 46 | 1 | 0 | 0.97 | 0.02 | 0.05 | 0.07 |
| 47 | 0.995 | 0.005 | 0.97 | 0.02 | 0.05 | 0.07 |
| 48 | 0.96 | 0.04 | 0.97 | 0.02 | 0.05 | 0.07 |
| 49 | 0.95 | 0.05 | 0.97 | 0.02 | 0.05 | 0.07 |
| 50 | 0.98 | 0.02 | 1 | 0 | 0 | 0 |
| 51 | 0.98 | 0.02 | 0.99 | 0.01 | 0 | 0.01 |
| 52 | 0.98 | 0.02 | 0.99 | 0 | 0.01 | 0.01 |
| 53 | 0.98 | 0.02 | 0.97 | 0.02 | 0.01 | 0.03 |
| 54 | 0.98 | 0.02 | 0.95 | 0.01 | 0.04 | 0.05 |
| 55 | 0.98 | 0.02 | 0.92 | 0.04 | 0.04 | 0.08 |
| 56 | 0.98 | 0.02 | 0.9 | 0.1 | 0 | 0.1 |
| 57 | 0.98 | 0.02 | 0.9 | 0 | 0.1 | 0.1 |
| 58 | 0.98 | 0.02 | 0.88 | 0.12 | 0 | 0.12 |
| 59 | 0.98 | 0.02 | 0.88 | 0 | 0.12 | 0.12 |
| 60 | 0.97 | 0.03 | 1 | 0 | 0 | 0 |
| 61 | 0.97 | 0.03 | 0.95 | 0.06 | 0.04 | 0.1 |
| 62 | 0.97 | 0.03 | 0.93 | 0.06 | 0.06 | 0.12 |
| 63 | 0.98 | 0.02 | 0.94 | 0.04 | 0 | 0.04 |
| 64 | 0.98 | 0.02 | 0.96 | 0.04 | 0 | 0.04 |
| 65 | 0.98 | 0.02 | 0.99 | 0.04 | 0 | 0.04 |
| 66 | 0.98 | 0.02 | 1.01 | 0.04 | 0 | 0.04 |
| 67 | 0.98 | 0.02 | 1.03 | 0.04 | 0 | 0.04 |
| 68 | 0.98 | 0.02 | 0.96 | 0.04 | 0.02 | 0.06 |
| 69 | 0.98 | 0.02 | 0.96 | 0.04 | 0.02 | 0.06 |
| 70 | 0.98 | 0.02 | 0.96 | 0.04 | 0.02 | 0.06 |
| 71 | 0.98 | 0.02 | 0.96 | 0.04 | 0.02 | 0.06 |
| 72 | 0.97 | 0.03 | 0.94 | 0.05 | 0.05 | 0.1 |
| 73 | 0.97 | 0.03 | 0.94 | 0.05 | 0.05 | 0.1 |
| 74 | 0.97 | 0.03 | 0.94 | 0.05 | 0.05 | 0.1 |
| 75 | 0.97 | 0.03 | 0.94 | 0.05 | 0.05 | 0.1 |
| 76 | 0.97 | 0.03 | 0.94 | 0.05 | 0.05 | 0.1 |
| 77 | 0.97 | 0.03 | 0.94 | 0.05 | 0.05 | 0.1 |
| 78 | 0.97 | 0.03 | 0.94 | 0.05 | 0.05 | 0.1 |
| 79 | 0.97 | 0.03 | 0.94 | 0.05 | 0.05 | 0.1 |
| 80 | 0.97 | 0.03 | 0.94 | 0.05 | 0.05 | 0.1 |
| 81 | 0.97 | 0.03 | 0.94 | 0.05 | 0.05 | 0.1 |
| 82 | 0.97 | 0.03 | 0.94 | 0.05 | 0.05 | 0.1 |
| 83 | 0.97 | 0.03 | 0.94 | 0.05 | 0.05 | 0.1 |
| 84 | 0.98 | 0.02 | 0.97 | 0.02 | 0.05 | 0.07 |
| 85 | 0.98 | 0.02 | 0.97 | 0.02 | 0.05 | 0.07 |
| 86 | 0.98 | 0.02 | 0.97 | 0.02 | 0.05 | 0.07 |
| 87 | 0.98 | 0.02 | 0.97 | 0.02 | 0.05 | 0.07 |
| 88 | 0.98 | 0.02 | 0.97 | 0.02 | 0.05 | 0.07 |
| 89 | 0.98 | 0.02 | 0.97 | 0.02 | 0.05 | 0.07 |
| 90 | 0.98 | 0.02 | 0.97 | 0.02 | 0.05 | 0.07 |
| 91 | 0.98 | 0.02 | 0.97 | 0.02 | 0.05 | 0.07 |
| 92 | 0.98 | 0.02 | 0.97 | 0.02 | 0.05 | 0.07 |
| 93 | 0.98 | 0.02 | 0.97 | 0.02 | 0.05 | 0.07 |
| 94 | 0.96 | 0.04 | 0.98 | 0.03 | 0.01 | 0.04 |
| 95 | 0.96 | 0.04 | 0.98 | 0.03 | 0.01 | 0.04 |
| 96 | 0.96 | 0.04 | 0.98 | 0.03 | 0.01 | 0.04 |
| 97 | 0.96 | 0.04 | 0.98 | 0.03 | 0.01 | 0.04 |
| 98 | 0.96 | 0.04 | 0.98 | 0.03 | 0.01 | 0.04 |
| 99 | 0.96 | 0.04 | 0.98 | 0.03 | 0.01 | 0.04 |
| 100 | 0.96 | 0.04 | 0.98 | 0.03 | 0.01 | 0.04 |
| 101 | 0.98 | 0.02 | 0.96 | 0.05 | 0.01 | 0.06 |
| 102 | 0.98 | 0.02 | 0.96 | 0.05 | 0.01 | 0.06 |
| 103 | 0.98 | 0.02 | 0.96 | 0.05 | 0.01 | 0.06 |
| 104 | 0.98 | 0.02 | 0.96 | 0.05 | 0.01 | 0.06 |
| 105 | 0.98 | 0.02 | 0.96 | 0.05 | 0.01 | 0.06 |
| 106 | 0.98 | 0.02 | 0.96 | 0.05 | 0.01 | 0.06 |
| 107 | 0.98 | 0.02 | 0.96 | 0.05 | 0.01 | 0.06 |
| 108 | 0.98 | 0.02 | 0.96 | 0.05 | 0.01 | 0.06 |
| 109 | 0.98 | 0.02 | 0.96 | 0.05 | 0.01 | 0.06 |
| 110 | 0.98 | 0.02 | 0.96 | 0.05 | 0.01 | 0.06 |
| 111 | 0.98 | 0.02 | 0.96 | 0.05 | 0.01 | 0.06 |
| 112 | 0.98 | 0.02 | 0.96 | 0.05 | 0.01 | 0.06 |
| 113 | 0.98 | 0.02 | 0.96 | 0.05 | 0.01 | 0.06 |
| 114 | 0.98 | 0.02 | 0.96 | 0.05 | 0.01 | 0.06 |
| 115 | 0.98 | 0.02 | 0.96 | 0.05 | 0.01 | 0.06 |
| 116 | 0.98 | 0.02 | 0.96 | 0.05 | 0.01 | 0.06 |
| 117 | 0.98 | 0.02 | 0.96 | 0.05 | 0.01 | 0.06 |
| 118 | 0.98 | 0.02 | 0.96 | 0.05 | 0.01 | 0.06 |
| 119 | 0.98 | 0.02 | 0.96 | 0.05 | 0.01 | 0.06 |
| 120 | 0.995 | 0.005 | 0.96 | 0.07 | 0.01 | 0.08 |
| 121 | 0.995 | 0.005 | 0.96 | 0.07 | 0.01 | 0.08 |
| 122 | 0.995 | 0.005 | 0.96 | 0.07 | 0.01 | 0.08 |
| 123 | 0.98 | 0.005 | 0.96 | 0.07 | 0.01 | 0.08 |
| 124 | 0.995 | 0.005 | 0.96 | 0.07 | 0.01 | 0.08 |
| 125 | 0.995 | 0.005 | 0.96 | 0.07 | 0.01 | 0.08 |

TABLE 2

Ceramic Compositions
Major Ingredient

| Test No. | y | | | | | | | Sum | k |
|---|---|---|---|---|---|---|---|---|---|
| | Sc | Y | Gd | Dy | Ho | Er | Yb | | |
| 1 | 0 | 0 | 0 | 0 | 0 | 0 | 0.01 | 0.01 | 1.02 |
| 2 | 0 | 0 | 0 | 0 | 0 | 0 | 0.01 | 0.01 | 1.02 |
| 3 | 0 | 0 | 0 | 0 | 0 | 0 | 0.01 | 0.01 | 1.02 |
| 4 | 0 | 0 | 0 | 0 | 0 | 0 | 0.01 | 0.01 | 1.02 |
| 5 | 0 | 0 | 0 | 0 | 0 | 0 | 0.01 | 0.01 | 1.02 |
| 6 | 0 | 0 | 0 | 0 | 0 | 0 | 0.01 | 0.01 | 1.02 |
| 7 | 0 | 0 | 0 | 0 | 0 | 0 | 0.01 | 0.01 | 1.02 |
| 8 | 0 | 0 | 0 | 0 | 0 | 0 | 0.01 | 0.01 | 1.02 |
| 9 | 0 | 0 | 0 | 0 | 0 | 0 | 0.01 | 0.01 | 1.02 |
| 10 | 0 | 0 | 0 | 0 | 0 | 0 | 0.01 | 0.01 | 1.02 |
| 11 | 0 | 0 | 0 | 0 | 0 | 0 | 0.01 | 0.01 | 1.02 |
| 12 | 0 | 0 | 0 | 0 | 0 | 0 | 0.01 | 0.01 | 1.02 |
| 13 | 0 | 0 | 0 | 0 | 0 | 0 | 0.01 | 0.01 | 1.02 |
| 14 | 0 | 0 | 0 | 0 | 0 | 0 | 0.01 | 0.01 | 1.02 |
| 15 | 0 | 0 | 0 | 0 | 0 | 0 | 0.01 | 0.01 | 1.02 |
| 16 | 0 | 0 | 0 | 0 | 0 | 0 | 0.01 | 0.01 | 1.02 |
| 17 | 0 | 0 | 0 | 0 | 0 | 0 | 0.01 | 0.01 | 1.02 |
| 18 | 0 | 0 | 0 | 0 | 0 | 0 | 0.01 | 0.01 | 1.02 |

TABLE 2-continued

Ceramic Compositions
Major Ingredient

| Test No. | Sc | Y | Gd | Dy | Ho | Er | Yb | Sum | k |
|---|---|---|---|---|---|---|---|---|---|
| 19 | 0 | 0 | 0 | 0 | 0 | 0 | 0.01 | 0.01 | 1.02 |
| 20 | 0 | 0 | 0 | 0 | 0 | 0 | 0.01 | 0.01 | 1.02 |
| 21 | 0 | 0 | 0 | 0 | 0 | 0 | 0.01 | 0.01 | 1.02 |
| 22 | 0 | 0 | 0 | 0 | 0 | 0 | 0.01 | 0.01 | 1.02 |
| 23 | 0 | 0 | 0 | 0 | 0 | 0 | 0.01 | 0.01 | 1.02 |
| 24 | 0.01 | 0 | 0 | 0 | 0 | 0 | 0 | 0.01 | 1.02 |
| 25 | 0 | 0.01 | 0 | 0 | 0 | 0 | 0 | 0.01 | 1.02 |
| 26 | 0 | 0 | 0.01 | 0 | 0 | 0 | 0 | 0.01 | 1.02 |
| 27 | 0 | 0 | 0 | 0.01 | 0 | 0 | 0 | 0.01 | 1.02 |
| 28 | 0 | 0 | 0 | 0 | 0.01 | 0 | 0 | 0.01 | 1.02 |
| 29 | 0 | 0 | 0 | 0 | 0 | 0.01 | 0 | 0.01 | 1.02 |
| 30 | 0 | 0 | 0 | 0.01 | 0 | 0 | 0 | 0.01 | 1.04 |
| 31 | 0 | 0 | 0 | 0.01 | 0 | 0 | 0 | 0.01 | 1.04 |
| 32 | 0 | 0 | 0 | 0.01 | 0 | 0 | 0 | 0.01 | 1.04 |
| 33 | 0 | 0 | 0 | 0.01 | 0 | 0 | 0 | 0.01 | 1.04 |
| 34 | 0 | 0 | 0 | 0.01 | 0 | 0 | 0 | 0.01 | 1.04 |
| 35 | 0 | 0 | 0 | 0.01 | 0 | 0 | 0 | 0.01 | 1.04 |
| 36 | 0 | 0 | 0 | 0 | 0 | 0 | 0 | 0 | 1.04 |
| 37 | 0 | 0 | 0 | 0 | 0 | 0 | 0.005 | 0.005 | 1.04 |
| 38 | 0 | 0 | 0 | 0 | 0 | 0 | 0.02 | 0.02 | 1.04 |
| 39 | 0 | 0 | 0 | 0 | 0 | 0 | 0.04 | 0.04 | 1.04 |
| 40 | 0 | 0 | 0 | 0 | 0 | 0 | 0.06 | 0.06 | 1.04 |
| 41 | 0 | 0 | 0 | 0 | 0 | 0 | 0.02 | 0.02 | 1.01 |
| 42 | 0 | 0 | 0 | 0 | 0 | 0 | 0.02 | 0.02 | 1.01 |
| 43 | 0 | 0 | 0 | 0 | 0 | 0 | 0.02 | 0.02 | 1.01 |
| 44 | 0 | 0 | 0 | 0 | 0 | 0 | 0.02 | 0.02 | 1.01 |
| 45 | 0 | 0 | 0 | 0 | 0 | 0 | 0.02 | 0.02 | 1.01 |
| 46 | 0 | 0 | 0 | 0.005 | 0 | 0 | 0 | 0.005 | 1.04 |
| 47 | 0 | 0 | 0 | 0.005 | 0 | 0 | 0 | 0.005 | 1.04 |
| 48 | 0 | 0 | 0 | 0.005 | 0 | 0 | 0 | 0.005 | 1.04 |
| 49 | 0 | 0 | 0 | 0.005 | 0 | 0 | 0 | 0.005 | 1.04 |
| 50 | 0 | 0 | 0 | 0 | 0 | 0 | 0.02 | 0.02 | 1 |
| 51 | 0 | 0 | 0 | 0 | 0 | 0 | 0.02 | 0.02 | 1 |
| 52 | 0 | 0 | 0 | 0 | 0 | 0 | 0.02 | 0.02 | 1 |
| 53 | 0 | 0 | 0 | 0 | 0 | 0 | 0.02 | 0.02 | 1 |
| 54 | 0 | 0 | 0 | 0 | 0 | 0 | 0.02 | 0.02 | 1 |
| 55 | 0 | 0 | 0 | 0 | 0 | 0 | 0.02 | 0.02 | 1 |
| 56 | 0 | 0 | 0 | 0 | 0 | 0 | 0.02 | 0.02 | 1 |
| 57 | 0 | 0 | 0 | 0 | 0 | 0 | 0.02 | 0.02 | 1 |
| 58 | 0 | 0 | 0 | 0 | 0 | 0 | 0.02 | 0.02 | 1 |
| 59 | 0 | 0 | 0 | 0 | 0 | 0 | 0.02 | 0.02 | 1 |
| 60 | 0 | 0 | 0 | 0.04 | 0 | 0 | 0 | 0.04 | 1 |
| 61 | 0 | 0 | 0 | 0.04 | 0 | 0 | 0 | 0.04 | 1.05 |
| 62 | 0 | 0 | 0 | 0.04 | 0 | 0 | 0 | 0.04 | 1.05 |
| 63 | 0 | 0 | 0 | 0 | 0 | 0 | 0.005 | 0.005 | 0.98 |
| 64 | 0 | 0 | 0 | 0 | 0 | 0 | 0.005 | 0.005 | 1 |
| 65 | 0 | 0 | 0 | 0 | 0 | 0 | 0.005 | 0.005 | 1.03 |
| 66 | 0 | 0 | 0 | 0 | 0 | 0 | 0.005 | 0.005 | 1.05 |
| 67 | 0 | 0 | 0 | 0 | 0 | 0 | 0.005 | 0.005 | 1.07 |
| 68 | 0 | 0 | 0 | 0.001 | 0 | 0 | 0.001 | 0.002 | 1.02 |
| 69 | 0 | 0 | 0 | 0.01 | 0 | 0 | 0.01 | 0.02 | 1.02 |
| 70 | 0 | 0 | 0 | 0.02 | 0 | 0 | 0.02 | 0.04 | 1.02 |
| 71 | 0 | 0 | 0 | 0.03 | 0 | 0 | 0.03 | 0.06 | 1.02 |
| 72 | 0 | 0 | 0 | 0.03 | 0 | 0 | 0.01 | 0.04 | 1.04 |
| 73 | 0 | 0.01 | 0 | 0 | 0 | 0 | 0.01 | 0.02 | 1.04 |
| 74 | 0.01 | 0 | 0 | 0 | 0.01 | 0 | 0 | 0.02 | 1.04 |
| 75 | 0 | 0.02 | 0 | 0.02 | 0 | 0 | 0 | 0.04 | 1.04 |
| 76 | 0 | 0 | 0 | 0 | 0 | 0.03 | 0.01 | 0.04 | 1.04 |
| 77 | 0 | 0.01 | 0 | 0.01 | 0 | 0 | 0.01 | 0.03 | 1.04 |
| 78 | 0.01 | 0 | 0 | 0.02 | 0 | 0 | 0.01 | 0.04 | 1.04 |
| 79 | 0 | 0.01 | 0 | 0.01 | 0.01 | 0.01 | 0 | 0.04 | 1.04 |
| 80 | 0.01 | 0.01 | 0 | 0.01 | 0 | 0 | 0.01 | 0.04 | 1.04 |
| 81 | 0.005 | 0.002 | 0.003 | 0.005 | 0 | 0.005 | 0.005 | 0.025 | 1.04 |
| 82 | 0.003 | 0.005 | 0.002 | 0.005 | 0.005 | 0.005 | 0.005 | 0.03 | 1.04 |
| 83 | 0.01 | 0.01 | 0.005 | 0.01 | 0.01 | 0.01 | 0.01 | 0.065 | 1.04 |
| 84 | 0 | 0 | 0 | 0 | 0.01 | 0 | 0 | 0.01 | 1.04 |
| 85 | 0 | 0 | 0 | 0 | 0.01 | 0 | 0 | 0.01 | 1.04 |
| 86 | 0 | 0 | 0 | 0 | 0.01 | 0 | 0 | 0.01 | 1.04 |
| 87 | 0 | 0 | 0 | 0 | 0.01 | 0 | 0 | 0.01 | 1.04 |
| 88 | 0 | 0 | 0 | 0 | 0.01 | 0 | 0 | 0.01 | 1.04 |
| 89 | 0 | 0 | 0 | 0 | 0.01 | 0 | 0 | 0.01 | 1.04 |
| 90 | 0 | 0 | 0 | 0 | 0.01 | 0 | 0 | 0.01 | 1.04 |
| 91 | 0 | 0 | 0 | 0 | 0.01 | 0 | 0 | 0.01 | 1.04 |
| 92 | 0 | 0 | 0 | 0 | 0.01 | 0 | 0 | 0.01 | 1.04 |
| 93 | 0 | 0 | 0 | 0 | 0.01 | 0 | 0 | 0.01 | 1.04 |
| 94 | 0 | 0 | 0 | 0 | 0 | 0.01 | 0 | 0.01 | 1.02 |
| 95 | 0 | 0 | 0 | 0 | 0 | 0.01 | 0 | 0.01 | 1.02 |
| 96 | 0 | 0 | 0 | 0 | 0 | 0.01 | 0 | 0.01 | 1.02 |
| 97 | 0 | 0 | 0 | 0 | 0 | 0.01 | 0 | 0.01 | 1.02 |
| 98 | 0 | 0 | 0 | 0 | 0 | 0.01 | 0 | 0.01 | 1.02 |
| 99 | 0 | 0 | 0 | 0 | 0 | 0.01 | 0 | 0.01 | 1.02 |
| 100 | 0 | 0 | 0 | 0 | 0 | 0.01 | 0 | 0.01 | 1.02 |
| 101 | 0 | 0 | 0 | 0 | 0 | 0 | 0.01 | 0.01 | 1.02 |
| 102 | 0 | 0 | 0 | 0 | 0 | 0 | 0.01 | 0.01 | 1.02 |
| 103 | 0 | 0 | 0 | 0 | 0 | 0 | 0.01 | 0.01 | 1.02 |
| 104 | 0 | 0 | 0 | 0 | 0 | 0 | 0.01 | 0.01 | 1.02 |
| 105 | 0 | 0 | 0 | 0 | 0 | 0 | 0.01 | 0.01 | 1.02 |
| 106 | 0 | 0 | 0 | 0 | 0 | 0 | 0.01 | 0.01 | 1.02 |
| 107 | 0 | 0 | 0 | 0 | 0 | 0 | 0.01 | 0.01 | 1.02 |
| 108 | 0 | 0 | 0 | 0 | 0 | 0 | 0.01 | 0.01 | 1.02 |
| 109 | 0 | 0 | 0 | 0 | 0 | 0 | 0.01 | 0.01 | 1.02 |
| 110 | 0 | 0 | 0 | 0 | 0 | 0 | 0.01 | 0.01 | 1.02 |
| 111 | 0 | 0 | 0 | 0 | 0 | 0 | 0.01 | 0.01 | 1.02 |
| 111 | 0 | 0 | 0 | 0 | 0 | 0 | 0.01 | 0.01 | 1.02 |
| 112 | 0 | 0 | 0 | 0 | 0 | 0 | 0.01 | 0.01 | 1.02 |
| 113 | 0 | 0 | 0 | 0 | 0 | 0 | 0.01 | 0.01 | 1.02 |
| 114 | 0 | 0 | 0 | 0 | 0 | 0 | 0.01 | 0.01 | 1.02 |
| 115 | 0 | 0 | 0 | 0 | 0 | 0 | 0.01 | 0.01 | 1.02 |
| 116 | 0 | 0 | 0 | 0 | 0 | 0 | 0.01 | 0.01 | 1.02 |
| 117 | 0 | 0 | 0 | 0 | 0 | 0 | 0.01 | 0.01 | 1.02 |
| 118 | 0 | 0 | 0 | 0 | 0 | 0 | 0.01 | 0.01 | 1.02 |
| 119 | 0 | 0 | 0 | 0 | 0 | 0 | 0.01 | 0.01 | 1.02 |
| 120 | 0 | 0 | 0 | 0 | 0 | 0 | 0.01 | 0.01 | 1.04 |
| 121 | 0 | 0 | 0 | 0 | 0 | 0 | 0.01 | 0.01 | 1.04 |
| 122 | 0 | 0 | 0 | 0 | 0 | 0 | 0.01 | 0.01 | 1.04 |
| 123 | 0 | 0 | 0 | 0 | 0 | 0 | 0.01 | 0.01 | 1.04 |
| 124 | 0 | 0 | 0 | 0 | 0 | 0 | 0.01 | 0.01 | 1.04 |
| 125 | 0 | 0 | 0 | 0 | 0 | 0 | 0.01 | 0.01 | 1.04 |

TABLE 3

Ceramic Compositions

| Test No. | First Additive Ingredient (wt. parts) | | | Second Additive Ingredient | | | | | | | | | |
|---|---|---|---|---|---|---|---|---|---|---|---|---|---|
| | Cr$_2$O$_3$ | Al$_2$O$_3$ | Sum | Proportion (wt. parts) | Composition (mole %) | | | | MO (mole %) | | | | |
| | | | | | B$_2$O$_3$ | Li$_2$O | SiO$_2$ | MO | BaO | SrO | CaO | MgO | ZnO |
| 1 | 0.1 | 0.1 | 0.2 | 2 | — | 1 | 80 | 19 | 20 | 0 | 50 | 30 | 0 |
| 2 | 0.1 | 0.1 | 0.2 | 2 | — | 1 | 39 | 60 | 20 | 0 | 50 | 30 | 0 |
| 3 | 0.1 | 0.1 | 0.2 | 2 | — | 30 | 30 | 40 | 20 | 0 | 50 | 30 | 0 |
| 4 | 0.1 | 0.1 | 0.2 | 2 | — | 50 | 50 | 0 | 0 | 0 | 0 | 0 | 0 |
| 5 | 0.1 | 0.1 | 0.2 | 2 | — | 20 | 80 | 0 | 0 | 0 | 0 | 0 | 0 |
| 6 | 0.1 | 0.1 | 0.2 | 2 | — | 10 | 50 | 40 | 20 | 0 | 50 | 30 | 0 |
| 7 | 0.1 | 0.1 | 0.2 | 2 | — | 30 | 40 | 30 | 20 | 0 | 50 | 30 | 0 |
| 8 | 0.1 | 0.1 | 0.2 | 2 | — | 20 | 60 | 20 | 20 | 0 | 50 | 30 | 0 |
| 9 | 0.1 | 0.1 | 0.2 | 2 | — | 35 | 65 | 0 | 0 | 0 | 0 | 0 | 0 |
| 10 | 0.1 | 0.1 | 0.2 | 2 | — | 1 | 59 | 40 | 20 | 0 | 50 | 30 | 0 |
| 11 | 0.1 | 0.1 | 0.2 | 2 | — | 1 | 85 | 14 | 20 | 0 | 50 | 30 | 0 |
| 12 | 0.1 | 0.1 | 0.2 | 2 | — | 20 | 29 | 51 | 20 | 0 | 50 | 30 | 0 |
| 13 | 0.1 | 0.1 | 0.2 | 2 | — | 50 | 30 | 20 | 20 | 0 | 50 | 30 | 0 |

TABLE 3-continued

| | | | | Ceramic Compositions | | | | | | | | | |
|---|---|---|---|---|---|---|---|---|---|---|---|---|---|
| First Additive Ingredient (wt. parts) | | | Second Additive Ingredient | | | | | | | | | | |
| | | | | Composition (mole %) | | | | MO (mole %) | | | | | |
| Test No. | Cr₂O₃ | Al₂O₃ | Sum | Proportion (wt. parts) | B₂O₃ | Li₂O | SiO₂ | MO | BaO | SrO | CaO | MgO | ZnO |
| 14 | 0.1 | 0.1 | 0.2 | 2 | — | 60 | 30 | 10 | 20 | 0 | 50 | 30 | 0 |
| 15 | 0.1 | 0.1 | 0.2 | 2 | — | 60 | 40 | 0 | 0 | 0 | 0 | 0 | 0 |
| 16 | 0.1 | 0.1 | 0.2 | 2 | — | 10 | 90 | 0 | 0 | 0 | 0 | 0 | 0 |
| 17 | 0.1 | 0.1 | 0.2 | 2 | — | 20 | 60 | 20 | 100 | 0 | 0 | 0 | 0 |
| 18 | 0.1 | 0.1 | 0.2 | 2 | — | 20 | 60 | 20 | 0 | 100 | 0 | 0 | 0 |
| 19 | 0.1 | 0.1 | 0.2 | 2 | — | 20 | 60 | 20 | 0 | 0 | 100 | 0 | 0 |
| 20 | 0.1 | 0.1 | 0.2 | 2 | — | 20 | 60 | 20 | 0 | 0 | 0 | 100 | 0 |
| 21 | 0.1 | 0.1 | 0.2 | 2 | — | 20 | 60 | 20 | 0 | 0 | 0 | 0 | 100 |
| 22 | 0.1 | 0.1 | 0.2 | 2 | — | 20 | 60 | 20 | 20 | 20 | 20 | 20 | 20 |
| 23 | 0.1 | 0.1 | 0.2 | 2 | — | 20 | 60 | 20 | 40 | 10 | 20 | 10 | 20 |
| 24 | 0.1 | 0.1 | 0.2 | 2 | — | 35 | 65 | 0 | 0 | 0 | 0 | 0 | 0 |
| 25 | 0.1 | 0.1 | 0.2 | 2 | — | 20 | 60 | 20 | 20 | 20 | 0 | 50 | 30 |
| 26 | 0.1 | 0.1 | 0.2 | 2 | — | 20 | 60 | 20 | 20 | 20 | 0 | 50 | 30 |
| 27 | 0.1 | 0.1 | 0.2 | 2 | — | 10 | 50 | 40 | 40 | 20 | 0 | 50 | 30 |
| 28 | 0.1 | 0.1 | 0.2 | 2 | — | 20 | 60 | 20 | 20 | 20 | 0 | 50 | 30 |
| 29 | 0.1 | 0.1 | 0.2 | 2 | — | 35 | 65 | 0 | 0 | 0 | 0 | 0 | 0 |
| 30 | 0 | 0.05 | 0.05 | 0 | — | 0 | 0 | 100 | 0 | 0 | 0 | 0 | 0 |
| 31 | 0 | 0.05 | 0.05 | 0.2 | — | 15 | 40 | 45 | 20 | 20 | 20 | 20 | 20 |
| 32 | 0 | 0.05 | 0.05 | 1 | — | 15 | 40 | 45 | 20 | 20 | 20 | 20 | 20 |
| 33 | 0 | 0.05 | 0.05 | 3 | — | 15 | 40 | 45 | 20 | 20 | 20 | 20 | 20 |
| 34 | 0 | 0.05 | 0.05 | 5 | — | 15 | 40 | 45 | 20 | 20 | 20 | 20 | 20 |
| 35 | 0 | 0.05 | 0.05 | 7 | — | 15 | 40 | 45 | 20 | 20 | 20 | 20 | 20 |
| 36 | 0.1 | 0 | 0.1 | 1 | — | 30 | 40 | 30 | 0 | 0 | 0 | 100 | 0 |
| 37 | 0.1 | 0 | 0.1 | 1 | — | 30 | 40 | 30 | 0 | 0 | 0 | 100 | 0 |
| 38 | 0.1 | 0 | 0.1 | 1 | — | 30 | 40 | 30 | 0 | 0 | 0 | 100 | 0 |
| 39 | 0.1 | 0 | 0.1 | 1 | — | 30 | 40 | 30 | 0 | 0 | 0 | 100 | 0 |
| 40 | 0.1 | 0 | 0.1 | 1 | — | 30 | 40 | 30 | 0 | 0 | 0 | 100 | 0 |
| 41 | 0.1 | 0 | 0.1 | 3 | — | 10 | 50 | 40 | 20 | 20 | 20 | 20 | 20 |
| 42 | 0.1 | 0 | 0.1 | 3 | — | 10 | 50 | 40 | 20 | 20 | 20 | 20 | 20 |
| 43 | 0.1 | 0 | 0.1 | 3 | — | 10 | 50 | 40 | 20 | 20 | 20 | 20 | 20 |
| 44 | 0.1 | 0 | 0.1 | 3 | — | 10 | 50 | 40 | 20 | 20 | 20 | 20 | 20 |
| 45 | 0.1 | 0 | 0.1 | 3 | — | 10 | 50 | 40 | 20 | 20 | 20 | 20 | 20 |
| 46 | 0.1 | 0 | 0.1 | 1 | — | 20 | 60 | 20 | 0 | 100 | 0 | 0 | 0 |
| 47 | 0.1 | 0 | 0.1 | 1 | — | 20 | 60 | 20 | 0 | 100 | 0 | 0 | 0 |
| 48 | 0.1 | 0 | 0.1 | 1 | — | 20 | 60 | 20 | 0 | 100 | 0 | 0 | 0 |
| 49 | 0.1 | 0 | 0.1 | 1 | — | 20 | 60 | 20 | 0 | 100 | 0 | 0 | 0 |
| 50 | 0.03 | 0.1 | 0.13 | 0.5 | — | 30 | 40 | 30 | 0 | 0 | 0 | 100 | 0 |
| 51 | 0.03 | 0.1 | 0.13 | 0.5 | — | 30 | 40 | 30 | 0 | 0 | 0 | 100 | 0 |
| 52 | 0.03 | 0.1 | 0.13 | 0.5 | — | 30 | 40 | 30 | 0 | 0 | 0 | 100 | 0 |
| 53 | 0.03 | 0.1 | 0.13 | 0.5 | — | 30 | 40 | 30 | 0 | 0 | 0 | 100 | 0 |
| 54 | 0.03 | 0.1 | 0.13 | 0.5 | — | 30 | 40 | 30 | 0 | 0 | 0 | 100 | 0 |
| 55 | 0.03 | 0.1 | 0.13 | 0.5 | — | 30 | 40 | 30 | 0 | 0 | 0 | 100 | 0 |
| 56 | 0.03 | 0.1 | 0.13 | 0.5 | — | 30 | 40 | 30 | 0 | 0 | 0 | 100 | 0 |
| 57 | 0.03 | 0.1 | 0.13 | 0.5 | — | 30 | 40 | 30 | 0 | 0 | 0 | 100 | 0 |
| 58 | 0.03 | 0.1 | 0.13 | 0.5 | — | 30 | 40 | 30 | 0 | 0 | 0 | 100 | 0 |
| 59 | 0.03 | 0.1 | 0.13 | 0.5 | — | 30 | 40 | 30 | 0 | 0 | 0 | 100 | 0 |
| 60 | 0.03 | 0.1 | 0.13 | 0.5 | — | 30 | 40 | 30 | 0 | 0 | 0 | 100 | 0 |
| 61 | 0.03 | 0.1 | 0.13 | 3 | — | 35 | 55 | 3 | 100 | 0 | 0 | 0 | 0 |
| 62 | 0.03 | 0.1 | 0.13 | 3 | — | 35 | 55 | 3 | 100 | 0 | 0 | 0 | 0 |
| 63 | 0.02 | 0 | 0.02 | 1 | — | 10 | 50 | 40 | 20 | 20 | 20 | 20 | 20 |
| 64 | 0.02 | 0 | 0.02 | 1 | — | 10 | 50 | 40 | 20 | 20 | 20 | 20 | 20 |
| 65 | 0.02 | 0 | 0.02 | 1 | — | 10 | 50 | 40 | 20 | 20 | 20 | 20 | 20 |
| 66 | 0.02 | 0 | 0.02 | 1 | — | 10 | 50 | 40 | 20 | 20 | 20 | 20 | 20 |
| 67 | 0.02 | 0 | 0.02 | 1 | — | 10 | 50 | 40 | 20 | 20 | 20 | 20 | 20 |
| 68 | 0.05 | 0.08 | 0.13 | 0.5 | — | 30 | 55 | 15 | 20 | 20 | 20 | 20 | 20 |
| 69 | 0.05 | 0.08 | 0.13 | 0.5 | — | 30 | 55 | 15 | 20 | 20 | 20 | 20 | 20 |
| 70 | 0.05 | 0.08 | 0.13 | 0.5 | — | 30 | 55 | 15 | 20 | 20 | 20 | 20 | 20 |
| 71 | 0.05 | 0.08 | 0.13 | 0.5 | — | 30 | 55 | 15 | 20 | 20 | 20 | 20 | 20 |
| 72 | 0.05 | 0.08 | 0.13 | 5 | — | 35 | 40 | 25 | 20 | 0 | 30 | 50 | 0 |
| 73 | 0.05 | 0.08 | 0.13 | 5 | — | 35 | 40 | 25 | 20 | 0 | 30 | 50 | 0 |
| 74 | 0.05 | 0.08 | 0.13 | 5 | — | 35 | 40 | 25 | 20 | 0 | 30 | 50 | 0 |
| 75 | 0.05 | 0.08 | 0.13 | 5 | — | 35 | 40 | 25 | 20 | 0 | 30 | 50 | 0 |
| 76 | 0.05 | 0.08 | 0.13 | 5 | — | 35 | 40 | 25 | 20 | 0 | 30 | 50 | 0 |
| 77 | 0.05 | 0.08 | 0.13 | 5 | — | 35 | 40 | 25 | 20 | 0 | 30 | 50 | 0 |
| 78 | 0.05 | 0.08 | 0.13 | 5 | — | 35 | 40 | 25 | 20 | 0 | 30 | 50 | 0 |
| 79 | 0.05 | 0.08 | 0.13 | 5 | — | 35 | 40 | 25 | 20 | 0 | 30 | 50 | 0 |
| 80 | 0.05 | 0.08 | 0.13 | 5 | — | 35 | 40 | 25 | 20 | 0 | 30 | 50 | 0 |
| 81 | 0.05 | 0.08 | 0.13 | 5 | — | 35 | 40 | 25 | 20 | 0 | 30 | 50 | 0 |
| 82 | 0.05 | 0.08 | 0.13 | 5 | — | 35 | 40 | 25 | 20 | 0 | 30 | 50 | 0 |
| 83 | 0.05 | 0.08 | 0.13 | 5 | — | 35 | 40 | 25 | 20 | 0 | 30 | 50 | 0 |
| 84 | 0.01 | 0 | 0.01 | 2 | — | 10 | 50 | 40 | 20 | 20 | 30 | 10 | 20 |
| 85 | 0 | 0.01 | 0.01 | 2 | — | 10 | 50 | 40 | 20 | 20 | 30 | 10 | 20 |
| 86 | 0.02 | 0.01 | 0.03 | 2 | — | 10 | 50 | 40 | 20 | 20 | 30 | 10 | 20 |
| 87 | 0.5 | 0.5 | 1 | 2 | — | 10 | 50 | 40 | 20 | 20 | 30 | 10 | 20 |
| 88 | 2 | 0.5 | 2.5 | 2 | — | 10 | 50 | 40 | 20 | 20 | 30 | 10 | 20 |
| 89 | 1.5 | 1.5 | 3 | 2 | — | 10 | 50 | 40 | 20 | 20 | 30 | 10 | 20 |

TABLE 3-continued

Ceramic Compositions

| | First Additive Ingredient (wt. parts) | | | Second Additive Ingredient | | | | | | | | | |
|---|---|---|---|---|---|---|---|---|---|---|---|---|---|
| | | | | Proportion | Composition (mole %) | | | | MO (mole %) | | | | |
| Test No. | Cr$_2$O$_3$ | Al$_2$O$_3$ | Sum | (wt. parts) | B$_2$O$_3$ | Li$_2$O | SiO$_2$ | MO | BaO | SrO | CaO | MgO | ZnO |
| 90  | 3    | 0    | 3    | 2   | —  | 10 | 50 | 40 | 20  | 20  | 30  | 10  | 20 |
| 91  | 0    | 3    | 3    | 2   | —  | 10 | 50 | 40 | 20  | 20  | 30  | 10  | 20 |
| 92  | 1.6  | 1.5  | 3.1  | 2   | —  | 10 | 50 | 40 | 20  | 20  | 30  | 10  | 20 |
| 93  | 2    | 2    | 4    | 2   | —  | 10 | 50 | 40 | 20  | 20  | 30  | 10  | 20 |
| 94  | 0.01 | 0    | 0.01 | 2   | —  | 20 | 70 | 10 | 0   | 10  | 0   | 10  | 80 |
| 95  | 0    | 0.01 | 0.01 | 2   | —  | 20 | 70 | 10 | 0   | 10  | 0   | 10  | 80 |
| 96  | 0.1  | 0.9  | 1    | 2   | —  | 20 | 70 | 10 | 0   | 10  | 0   | 10  | 80 |
| 97  | 1    | 1    | 2    | 2   | —  | 20 | 70 | 10 | 0   | 10  | 0   | 10  | 80 |
| 98  | 1    | 2    | 3    | 2   | —  | 20 | 70 | 10 | 0   | 10  | 0   | 10  | 80 |
| 99  | 2    | 1.1  | 3.1  | 2   | —  | 20 | 70 | 10 | 0   | 10  | 0   | 10  | 80 |
| 100 | 2    | 2    | 4    | 2   | —  | 20 | 70 | 10 | 0   | 10  | 0   | 10  | 80 |
| 101 | 0.1  | 0.1  | 0.2  | 2   | 1  | —  | 80 | 19 | 20  | 0   | 50  | 30  | 0  |
| 102 | 0.1  | 0.1  | 0.2  | 2   | 1  | —  | 39 | 60 | 20  | 0   | 50  | 30  | 0  |
| 103 | 0.1  | 0.1  | 0.2  | 2   | 30 | —  | 0  | 70 | 20  | 0   | 50  | 30  | 0  |
| 104 | 0.1  | 0.1  | 0.2  | 2   | 90 | —  | 0  | 10 | 20  | 0   | 50  | 30  | 0  |
| 105 | 0.1  | 0.1  | 0.2  | 2   | 90 | —  | 10 | 0  | 0   | 0   | 0   | 0   | 0  |
| 106 | 0.1  | 0.1  | 0.2  | 2   | 20 | —  | 80 | 0  | 0   | 0   | 0   | 0   | 0  |
| 107 | 0.1  | 0.1  | 0.2  | 2   | 15 | —  | 30 | 55 | 20  | 0   | 50  | 30  | 0  |
| 108 | 0.1  | 0.1  | 0.2  | 2   | 45 | —  | 15 | 40 | 20  | 0   | 50  | 30  | 0  |
| 109 | 0.1  | 0.1  | 0.2  | 2   | 20 | —  | 50 | 30 | 20  | 0   | 50  | 30  | 0  |
| 110 | 0.1  | 0.1  | 0.2  | 2   | 50 | —  | 30 | 20 | 20  | 0   | 50  | 30  | 0  |
| 111 | 0.1  | 0.1  | 0.2  | 2   | 10 | —  | 20 | 70 | 20  | 0   | 50  | 30  | 0  |
| 112 | 0.1  | 0.1  | 0.2  | 2   | 95 | —  | 5  | 0  | 0   | 0   | 0   | 0   | 0  |
| 113 | 0.1  | 0.1  | 0.2  | 2   | 10 | —  | 85 | 5  | 20  | 0   | 50  | 30  | 0  |
| 114 | 0.1  | 0.1  | 0.2  | 2   | 20 | —  | 50 | 30 | 100 | 0   | 0   | 0   | 0  |
| 115 | 0.1  | 0.1  | 0.2  | 2   | 20 | —  | 50 | 30 | 0   | 100 | 0   | 0   | 0  |
| 116 | 0.1  | 0.1  | 0.2  | 2   | 20 | —  | 50 | 30 | 0   | 0   | 100 | 0   | 0  |
| 117 | 0.1  | 0.1  | 0.2  | 2   | 20 | —  | 50 | 30 | 0   | 0   | 0   | 100 | 0  |
| 118 | 0.1  | 0.1  | 0.2  | 2   | 20 | —  | 50 | 30 | 0   | 0   | 0   | 0   | 100|
| 119 | 0.1  | 0.1  | 0.2  | 2   | 20 | —  | 50 | 30 | 20  | 20  | 20  | 20  | 20 |
| 120 | 0    | 0.05 | 0.05 | 0   | 0  | —  | 0  | 0  | 0   | 0   | 0   | 0   | 0  |
| 121 | 0    | 0.05 | 0.05 | 0.2 | 15 | —  | 75 | 10 | 0   | 50  | 0   | 50  | 30 |
| 122 | 0    | 0.05 | 0.05 | 1   | 15 | —  | 75 | 10 | 0   | 50  | 0   | 50  | 30 |
| 123 | 0    | 0.05 | 0.05 | 3   | 15 | —  | 75 | 10 | 0   | 50  | 0   | 50  | 30 |
| 124 | 0    | 0.05 | 0.05 | 5   | 15 | —  | 75 | 10 | 0   | 50  | 0   | 50  | 30 |
| 125 | 0    | 0.05 | 0.05 | 7   | 15 | —  | 75 | 10 | 0   | 50  | 0   | 50  | 30 |

According to Tables 1 and 2, the major ingredient of the dielectric bodies of the capacitors of Test No. 1 was:

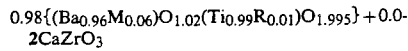

$0.98\{(Ba_{0.96}M_{0.06})O_{1.02}(Ti_{0.99}R_{0.01})O_{1.995}\}+0.02CaZrO_3$ or, more specifically, since $M_{0.06}=Mg_{0.05}$, $Zn_{0.01}$, and $R_{0.01}=Yb_{0.01}$,

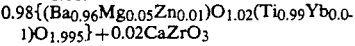

$0.98\{(Ba_{0.96}Mg_{0.05}Zn_{0.01})O_{1.02}(Ti_{0.99}Yb_{0.01})O_{1.995}\}+0.02CaZrO_3$

One hundred parts by weight of this major ingredient was admixed with 0.2 parts by weight of a first additive ingredients or the sum of 0.1 parts by weight of Cr$_2$O$_3$ and 0.1 parts by weight of Al$_2$O$_3$, and 2.0 parts by weight of a second additive ingredients of one mole percent Li$_2$O, 80 mole percent SiO$_2$ and 19 mole percent MO. The MO was a mixture of 20 mole percent BaO, 50 mole percent CaO, and 30 mole percent MgO.

For the fabrication of the capacitors of Test No. 1 we started with the preparation of the first component, (Ba$_{0.96}$Mg$_{0.05}$Zn$_{0.01}$)O$_{1.02}$(Ti$_{0.99}$Yb$_{0.01}$)O$_{1.995}$, of the major ingredient. We prepared the following start materials for the first component of the major ingredient:

Barium carbonate (BaCO$_3$):
1041.96 grams (0.96 mole part)

Magnesium oxide (MgO):
11.09 grams (0.05 mole part)

Zinc oxide (ZnO)
4.48 grams (0.01 mole part)

Titanium oxide (TiO$_2$):
435.06 grams (0.99 mole part)

Yttrebium oxide (Yb$_2$O$_3$)
10.84 grams (0.005 mole part)

These start materials had all purities of not less than 99.0 percent. The above specified weights of the start materials do not include those of the impurities contained.

We charged the start materials into a pot mill together with alumina balls and 2.5 liters of water and intimately intermingled them by stirring the pot mill for 15 hours. Then we introduced the mixture into a stainless steel pot and dried it by air heated to 150 degrees C. for four hours. Then we crushed the dried mixture into relatively coarse particles and then fired the particles in air within a tunnel furnace at 1200 degrees C. for two hours. There was thus obtained the first component of the major ingredient in finely divided form.

Then we proceeded to the preparation of the second component, CaZrO$_3$, of the major ingredient of Tset No. 1. We intermingled 448.96 grams of calcium carbonate (CaCO$_3$) and 551.04 grams of zirconium oxide (ZrO$_2$). Then we dried and pulverized the mixture and fired the resulting particles in air at 1250 degrees C. for two hours.

Then, in order to obtain the major ingredient of Test No. 1 in the required molar ratio (0.98:0.02) of the first and second components, we intermingled 984.34 grams (98 mole parts) of (Ba$_{0.96}$Mg$_{0.05}$Zn$_{0.01}$)O$_{1.02}$(Ti$_{0.99}$Yb$_{0.01}$) O$_{1.995}$ and 15.66 grams (two mole parts) of $CaZrO_3$. One thousand grams of the major ingredient was thus obtained in finely divided form.

Then, in order to obtain the second additive ingredients of Test No. 1 we first prepared the following substances in the following amounts:
$Li_2O$: 0.44 grams (1.0 mole part)
$SiO_2$: 70.99 grams (80.0 mole parts)
$BaCO_3$: 11.10 grams (3.8 mole parts)
$CaCO_3$: 14.70 grams (9.5 mole parts)
MgO: 3.40 grams (5.7 mole parts)

To these substances we added 300 cubic centimeters of alcohol and stirred the resulting slurry for 10 hours in a polyethylene pot with alumina balls. Then we air fired the mixture at 1000 degrees C. for two hours. Then we charged the fired mixture into an alumina pot together with 300 cubic centimeters of water and pulverized it with alumina balls over a period of 15 hours. Then we dried the pulverized mixture at 150 degrees C. for four hours.

Thus we obtained in finely divided form the desired additive mixture of one mole percent $Li_2O$, 80 mole percent $SiO_2$ and 19 mole percent MO, with the MO consisting of 3.8 mole percent BaO, 9.5 mole percent CaO, and 5.7 mole percent MgO. The relative proportions of BaO, CaO, and MgO were 20, 50 and 30 mole percent.

For the first additive ingredient of Test No. 1 we prepared a dichromium trioxide($Cr_2O_3$) powder and aluminum oxide ($Al_2O_3$) powder with a purity of not less than 99.0 percent. The dichromium trioxide powder and aluminum oxide powder have an average particle size of 0.5 micrometers respectively.

Then, we added 2 grams (0.2 weight parts) of the first additive ingredient and 20 grams (two weight parts) of the second additive ingredient to 1000 grams (100 weight parts) of the major ingredient. Further, to this mixture, we added 15 percent by weight of an organic binder and 50 percent by weight of water with respect to the total weight of the major ingredient and additives. The organic binder was an aqueous solution of acrylic ester polymer, glycerine, and condensed phosphate. Then we ball milled the mixture into a slurry and then defoamed it in vacuum.

Then we charged the defoamed slurry into a reverse roll coater and shaped it into a thin, continuous strip on an elongate backing strip of polyester film. Then we dried the strip by heating it to 100 degrees C. on the backing film. There was thus obtained a green ceramic strip with a thickness of approximately 25 micrometers. We subsequently punched it into "squares" sized 10 by 10 centimeters. These green ceramic squares were to become the ceramic layers 12, FIG. 1, in the completed test capacitors 10.

For the fabrication of the base metal film electrodes 14 on the ceramic layers 12, we prepared 10 grams of nickel in finely divided form, with an average particle size of 1.5 micrometers, and a solution of 0.9 grams of ethyl cellulose in 9.1 grams of butyl "Carbitol" (trademark for diethylene glycol monobutyl ether). We intimately intermingled them in an agitator for 10 hours, thereby providing an electroconductive paste. Then we "printed" the paste on one surface of each green ceramic square, which had been prepared as above stated, through a screen having an array of 50 perforations of rectangular shape, each sized seven by 14 millimeters.

After having allowed the printed paste to dry, we stacked two green squares, with the printings thereon directed upwardly, and with the printings on the two squares offset from each other to an extent approximately half the pitch of the paste pattern in the longitudinal direction. Then we placed the stack of two printed squares between two separate stacks of four unprinted squares each with a thickness of 60 micrometers. Then we exerted a pressure of 39.2 MPa on the resulting stack of printed and unprinted squares in their thickness direction at 50 degrees C., thereby firmly bonding them together. Then we cut the bonded squares in a latticed pattern into 50 laminate chips of identical construction.

We employed a furnace capable of atmosphere control for cofiring the above prepared green dielectric bodies and, buried therein, the conductive layers which were to become the film electrodes 14 in the completed capacitors 10. We first air heated the chips to 600 degrees C. at a rate of 100 degrees C. per hour, thereby driving off the organic binder that had been used for providing the slurry of the powdered major ingredient and additives. Then we changed the furnace atmosphere from air to a reductive (nonoxidative) atmosphere consisting of two percent by volume of molecular hydroge and 98 percent by volume of molecular nitrogen. Then, in this furnace atmosphere, we raised the furnace temperature from 600 degrees C. to 1150 degrees C. at a rate of 100 degrees C. per hour. We maintained for three hours the maximum furnace temperature of 1150 degrees C., at which the ceramic bodies formulated an accordance with our invention were to be sintered to maturity. Then we lowered the furnace temperature to 600 degrees C. at a rate of 100 degrees C. per hour. Then, with the furnace atmosphere again changed to air (oxidative atmosphere), we maintained the temperature of 600 degrees C. fo 30 minutes for the oxidizing heat treatment of the sintered chips. Then we allowed the furnace temperature to drop to room temperature.

Thus we obtained the dielectric ceramic bodies 15 cosintered with the film electrodes 14 buried therein.

We proceeded to the production of the pair of conductive terminations 16 on both sides of each ceramic body 15 at which were exposed the film electrodes 14. First, for the production of the inmost zinc layers 18, we coated both sides of each ceramic body 15 with an electroconductive paste composed of zinc, glass frit and vehicle. Then, after having allowed the coatings to dry, we heated them to 550 degrees C. in air and held the temperature for 15 minutes, thereby completing the zinc layers 18 each in direct contact with one of the two film electrodes 14. Then we formed the intermediate copper layers 20 over the zinc layers 18 by electroless plating, and then the outermost solder layers 22 over the copper layers 20 by electroplating an alloy of lead and tin.

We have thus completed the fabrication of the monolithic, multilayered ceramic test capacitors 10, each constructed as in FIG. 1, in accordance with the ceramic composition of Test No. 1 of Tables 1, 2 and 3. The composition of the ceramic bodies 15 of the thus completed capacitors 10 proved substantially akin to that before sintering.

As for the other ceramic compositions of Tables 1, 2 and 3 designated Tests Nos. 2–125, we made similar capacitors through the same procedure as set forth in the foregoing in connection with the Test No. 1 composition, except for the temperature of sintering in the reductive atmosphere, to which we will presently refer in more detail.

Then we tested all the capacitors of Tests Nos. 1–125 as to their specific dielectric constants, dielectric losses, resistivities, and capacitance-temperature characteristics. We measured these electrical properties of the test capacitors by the following methods:

Specific Dielectric Constant

The capacitance of each test capacitor was first measured at a temperature of 20 degrees C., a frequency of one kilohertz, and an effective voltage of 1.0 volt. Then the specific dielectric constant was computed from the measured value of capacitance, and the area (25 square millimeters) of each of the opposed parts of the film electrodes 14, and the thickness (0.02 millimeter) of that ceramic layer 12 which intervenes between the film electrodes.

Dielectric Loss

The dielectric loss was measured under the same conditions as the specific constant.

Resistivity

Resistance between the pair of conductive terminations 16 of each test capacitor was measured after the application of a direct voltage of 100 volts for one minute. Then the resistivity was computed from the measured resistance value and the size of each test capacitor.

Temperature Dependence of Capacitance

The test capacitors were introduced into a thermostatic oven, and their capacitances at various preselected temperatures were measured at a frequency of one kilohertz and an effective voltage of 1.0 volt. Then the percent changes of the capacitances at $-55$ degrees and $+125$ degrees C. from those at 25 degrees C., and at $-25$ degrees and $+85$ degrees C. from those at 20 degrees C., were computed.

Table 4 gives the properties of the test capacitors as measured by the above described methods, as well as the maximum temperatures at which the test capacitors were sintered in the reductive atmosphere during their manufacture.

TABLE 4

Firing Temperature & Capacitor Characteristics

| Test No. | Firing Temp. (°C.) | Specific Dielectric Constant | Dielectric Loss (%) | Resistivity (megohm-cm) | Capacitance Variations (%) | | | |
|---|---|---|---|---|---|---|---|---|
| | | | | | At −55° C. | At 125° C. | At −25° C. | At 85° C. |
| 1 | 1150 | 3950 | 1.1 | $7.0 \times 10^6$ | −10.8 | 3.0 | −5.6 | −6.0 |
| 2 | 1170 | 3880 | 1.0 | $6.4 \times 10^6$ | −9.8 | 1.4 | −4.3 | −7.3 |
| 3 | 1140 | 3880 | 1.1 | $6.6 \times 10^6$ | −10.5 | 4.1 | −5.4 | −5.0 |
| 4 | 1140 | 3950 | 1.3 | $5.0 \times 10^6$ | −10.6 | 5.0 | −5.7 | −4.8 |
| 5 | 1130 | 3870 | 1.3 | $4.8 \times 10^6$ | −10.7 | 5.4 | −6.4 | −4.1 |
| 6 | 1150 | 3920 | 1.2 | $5.0 \times 10^6$ | −10.1 | 2.7 | −5.8 | −5.7 |
| 7 | 1140 | 3970 | 1.1 | $4.1 \times 10^6$ | −11.0 | 4.1 | −5.9 | −6.2 |
| 8 | 1140 | 3860 | 1.1 | $5.8 \times 10^6$ | −11.2 | 5.1 | −6.2 | −5.1 |
| 9 | 1150 | 3950 | 1.1 | $4.7 \times 10^6$ | −10.9 | 4.9 | −6.5 | −3.8 |
| 10 | 1150 | 3800 | 1.1 | $4.1 \times 10^6$ | −9.3 | 3.7 | −5.7 | −6.0 |
| 11 | 1250 | | | Not coherently bonded on firing | | | | |
| 12 | 1250 | | | " | | | | |
| 13 | 1250 | | | " | | | | |
| 14 | 1250 | | | " | | | | |
| 15 | 1250 | | | " | | | | |
| 16 | 1250 | | | " | | | | |
| 17 | 1140 | 3870 | 1.1 | $6.3 \times 10^6$ | −11.5 | 5.3 | −6.0 | −5.3 |
| 18 | 1140 | 3860 | 1.0 | $5.6 \times 10^6$ | −10.0 | 3.1 | −6.5 | −5.8 |
| 19 | 1150 | 3860 | 1.1 | $5.7 \times 10^6$ | −10.4 | 4.7 | −6.1 | −5.2 |
| 20 | 1150 | 3870 | 1.2 | $6.7 \times 10^6$ | −10.2 | 4.9 | −6.1 | −5.1 |
| 21 | 1140 | 3890 | 1.1 | $4.2 \times 10^6$ | −9.9 | 3.7 | −5.8 | −5.2 |
| 22 | 1130 | 3900 | 1.0 | $5.5 \times 10^6$ | −9.7 | 5.1 | −6.1 | −5.2 |
| 23 | 1140 | 3900 | 1.2 | $4.6 \times 10^6$ | −10.8 | 4.5 | −5.9 | −5.3 |
| 24 | 1140 | 3910 | 1.2 | $4.4 \times 10^6$ | −8.8 | 4.0 | −6.3 | −5.1 |
| 25 | 1140 | 3850 | 1.1 | $3.8 \times 10^6$ | −10.8 | 1.3 | −5.0 | −5.2 |
| 26 | 1130 | 3880 | 1.2 | $3.9 \times 10^6$ | −9.8 | 4.0 | −6.0 | −5.9 |
| 27 | 1130 | 3910 | 1.1 | $7.3 \times 10^6$ | −10.4 | 3.1 | −4.7 | −5.3 |
| 28 | 1140 | 3910 | 1.1 | $4.8 \times 10^6$ | −10.7 | 4.0 | −5.6 | −5.4 |
| 29 | 1150 | 3890 | 1.0 | $4.3 \times 10^6$ | −10.6 | 2.8 | −4.4 | −5.3 |
| 30 | 1250 | | | Not coherently bonded on firing | | | | |
| 31 | 1180 | 4540 | 1.4 | $2.1 \times 10^6$ | −11.0 | 2.7 | −6.3 | −5.2 |
| 32 | 1170 | 4120 | 1.3 | $2.8 \times 10^6$ | −10.8 | 2.8 | −6.0 | −4.7 |
| 33 | 1120 | 3510 | 1.1 | $6.1 \times 10^6$ | −12.1 | 0 | −6.9 | −7.2 |
| 34 | 1090 | 3200 | 1.6 | $2.6 \times 10^6$ | −12.9 | −2.7 | −8.0 | −8.8 |
| 35 | 1060 | 2810 | 1.8 | $2.0 \times 10^6$ | −16.0 | −5.2 | −9.5 | −12.6 |
| 36 | 1160 | 4060 | 1.3 | $1.8 \times 10^6$ | −9.9 | 3.0 | −6.2 | −5.4 |
| 37 | 1150 | 4120 | 1.2 | $2.8 \times 10^6$ | −9.9 | 3.0 | −5.6 | −4.5 |
| 38 | 1100 | 4280 | 1.2 | $5.5 \times 10^6$ | −7.7 | 3.1 | −4.8 | −2.9 |
| 39 | 1150 | 3990 | 1.3 | $1.5 \times 10^6$ | −9.1 | 3.3 | −5.3 | −4.4 |
| 40 | 1250 | | | Not coherently bonded on firing | | | | |
| 41 | 1140 | 3850 | 1.2 | $7.3 \times 10^6$ | −20.9 | 9.5 | −12.2 | 3.9 |
| 42 | 1110 | 3860 | 1.1 | $7.7 \times 10^6$ | −13.0 | 4.8 | −8.5 | −2.7 |
| 43 | 1110 | 3900 | 1.2 | $7.0 \times 10^6$ | −11.5 | 2.4 | −1.8 | −6.3 |
| 44 | 1120 | 4020 | 1.1 | $6.3 \times 10^6$ | −4.5 | −3.5 | −2.3 | −9.0 |
| 45 | 1120 | 3880 | 1.1 | $6.4 \times 10^6$ | 1.5 | −8.2 | −0.7 | −12.8 |
| 46 | 1190 | 4090 | 1.2 | $6.4 \times 10^6$ | −16.1 | 6.9 | −11.7 | 3.8 |
| 47 | 1170 | 4180 | 1.2 | $4.9 \times 10^6$ | −14.6 | 3.3 | −9.5 | −2.4 |

TABLE 4-continued

Firing Temperature & Capacitor Characteristics

Capacitor Characteristics

| Test No. | Firing Temp. (°C.) | Specific Dielectric Constant | Dielectric Loss (%) | Resistivity (megohm-cm) | Capacitance Variations (%) | | | |
|---|---|---|---|---|---|---|---|---|
| | | | | | At −55° C. | At 125° C. | At −25° C. | At 85° C. |
| 48 | 1160 | 4040 | 1.1 | $5.0 \times 10^6$ | −2.2 | −7.1 | −1.0 | −8.3 |
| 49 | 1160 | 4150 | 1.2 | $5.9 \times 10^6$ | 3.9 | −12.6 | 0.6 | −11.9 |
| 50 | 1170 | 3830 | 1.7 | $4.3 \times 10^6$ | −15.8 | 6.8 | −11.0 | −6.3 |
| 51 | 1150 | 4140 | 1.2 | $8.0 \times 10^6$ | −13.6 | 8.0 | −8.0 | −5.1 |
| 52 | 1160 | 4240 | 1.6 | $3.9 \times 10^6$ | −13.4 | 5.0 | −8.7 | −5.5 |
| 53 | 1170 | 4050 | 1.1 | $7.2 \times 10^6$ | −11.2 | 4.7 | −5.8 | −3.9 |
| 54 | 1160 | 3990 | 1.5 | $3.5 \times 10^6$ | −9.8 | 3.8 | −5.9 | −5.4 |
| 55 | 1150 | 3900 | 1.1 | $9.9 \times 10^6$ | −9.9 | 2.6 | −5.6 | −6.8 |
| 56 | 1200 | 3810 | 1.0 | $8.0 \times 10^6$ | −11.0 | 1.2 | −6.3 | −8.6 |
| 57 | 1190 | 3610 | 1.6 | $8.0 \times 10^6$ | −11.8 | 1.5 | −7.4 | −8.5 |
| 58 | 1180 | 3850 | 1.1 | $7.7 \times 10^6$ | −10.1 | −2.6 | −5.8 | −11.5 |
| 59 | 1170 | 3570 | 1.8 | $2.2 \times 10^6$ | −12.2 | −3.1 | −8.4 | −11.7 |
| 60 | 1140 | 3670 | 1.8 | $1.2 \times 10^6$ | −18.8 | −12.6 | −12.0 | −6.4 |
| 61 | 1190 | 3390 | 1.0 | $3.3 \times 10^6$ | −3.4 | −2.1 | −1.5 | −9.5 |
| 62 | 1180 | 3250 | 1.2 | $3.6 \times 10^6$ | −3.9 | −4.3 | −1.3 | −11.2 |
| 63 | 1130 | 3210 | 2.6 | $4.6 \times 10^4$ | −19.1 | −12.4 | −15.0 | −8.2 |
| 64 | 1150 | 3830 | 1.1 | $2.9 \times 10^6$ | −11.8 | 6.8 | −6.9 | −4.8 |
| 65 | 1150 | 3800 | 1.0 | $4.3 \times 10^6$ | −11.4 | 5.9 | −6.8 | −4.4 |
| 66 | 1180 | 3620 | 1.2 | $5.2 \times 10^6$ | −9.7 | 2.4 | −5.5 | −5.1 |
| 67 | 1250 | | | Not coherently bonded on firing | | | | |
| 68 | 1170 | 3770 | 1.1 | $1.1 \times 10^6$ | −11.0 | −0.8 | −5.3 | −6.8 |
| 69 | 1120 | 4070 | 1.1 | $4.4 \times 10^6$ | −9.6 | −0.3 | −4.2 | −5.9 |
| 70 | 1160 | 3840 | 1.0 | $3.1 \times 10^6$ | −9.7 | −1.0 | −5.0 | −6.5 |
| 71 | 1250 | | | Not coherently bonded on firing | | | | |
| 72 | 1150 | 3890 | 1.2 | $4.0 \times 10^6$ | −3.9 | −2.6 | −1.3 | −7.1 |
| 73 | 1130 | 4120 | 1.1 | $6.7 \times 10^6$ | −3.6 | −2.7 | −1.0 | −7.0 |
| 74 | 1120 | 4130 | 1.1 | $4.6 \times 10^6$ | −3.5 | −2.2 | −1.4 | −7.1 |
| 75 | 1150 | 3870 | 1.1 | $3.6 \times 10^6$ | −4.4 | −3.5 | −2.3 | −8.7 |
| 76 | 1150 | 3880 | 1.1 | $2.7 \times 10^6$ | −3.9 | −3.6 | −2.3 | −8.5 |
| 77 | 1150 | 3980 | 1.0 | $4.4 \times 10^6$ | −3.6 | −2.8 | −1.3 | −7.7 |
| 78 | 1160 | 3850 | 1.2 | $1.8 \times 10^6$ | −4.8 | −3.5 | −2.0 | −8.5 |
| 79 | 1150 | 3810 | 1.2 | $3.0 \times 10^6$ | −4.0 | −3.3 | −1.7 | −8.3 |
| 80 | 1150 | 3860 | 1.1 | $1.6 \times 10^6$ | −4.1 | −4.0 | −2.0 | −8.6 |
| 81 | 1130 | 4180 | 1.0 | $3.1 \times 10^6$ | −3.7 | −2.8 | −1.7 | −7.9 |
| 82 | 1140 | 3950 | 1.1 | $5.2 \times 10^6$ | −4.0 | −3.1 | −1.5 | −8.1 |
| 83 | 1250 | | | Not coherently bonded on firing | | | | |
| 84 | 1150 | 3940 | 1.1 | $6.8 \times 10^6$ | −8.7 | 3.8 | −6.2 | −6.5 |
| 85 | 1150 | 3960 | 1.2 | $4.8 \times 10^6$ | −9.9 | 2.8 | −5.0 | −5.2 |
| 86 | 1160 | 3810 | 1.1 | $5.5 \times 10^6$ | −10.4 | 3.0 | −5.1 | −6.3 |
| 87 | 1160 | 3760 | 1.0 | $6.1 \times 10^6$ | −11.6 | 3.0 | −5.8 | −6.0 |
| 88 | 1170 | 3750 | 1.1 | $5.3 \times 10^6$ | −11.6 | 2.9 | −6.1 | −6.8 |
| 89 | 1180 | 3480 | 1.0 | $6.2 \times 10^6$ | −10.1 | 3.6 | −4.7 | −4.9 |
| 90 | 1180 | 3220 | 1.1 | $6.0 \times 10^6$ | −9.4 | 3.2 | −5.6 | −5.0 |
| 91 | 1220 | 3120 | 1.1 | $5.0 \times 10^6$ | −8.4 | 2.6 | −5.1 | −4.5 |
| 92 | 1250 | | | Not coherently bonded on firing | | | | |
| 93 | 1250 | | | " | | | | |
| 94 | 1140 | 3760 | 1.2 | $6.5 \times 10^6$ | −10.1 | 3.8 | −4.5 | −5.3 |
| 95 | 1160 | 3810 | 1.2 | $5.2 \times 10^6$ | −10.5 | 3.7 | −4.6 | −5.4 |
| 96 | 1180 | 3470 | 1.1 | $5.1 \times 10^6$ | −9.7 | 3.9 | −6.2 | −4.8 |
| 97 | 1200 | 3360 | 1.1 | $6.9 \times 10^6$ | −10.3 | 2.6 | −5.7 | −4.8 |
| 98 | 1210 | 3180 | 1.2 | $6.5 \times 10^6$ | −8.8 | 2.7 | −5.2 | −4.2 |
| 99 | 1250 | | | Not coherently bonded on firing | | | | |
| 100 | 1250 | | | " | | | | |
| 101 | 1130 | 3720 | 1.1 | $3.7 \times 10^6$ | −10.5 | 4.5 | −6.5 | −3.4 |
| 102 | 1130 | 3700 | 1.1 | $4.0 \times 10^6$ | −10.6 | 3.3 | −5.0 | −4.6 |
| 103 | 1130 | 3660 | 1.1 | $4.9 \times 10^6$ | −9.3 | 3.0 | −4.9 | −3.5 |
| 104 | 1110 | 3570 | 1.2 | $3.9 \times 10^6$ | −12.2 | 5.6 | −6.0 | −2.5 |
| 105 | 1100 | 3560 | 1.1 | $3.5 \times 10^6$ | −12.5 | 5.8 | −6.5 | −2.1 |
| 106 | 1120 | 3620 | 1.1 | $1.5 \times 10^6$ | −9.6 | 3.9 | −5.2 | −2.6 |
| 107 | 1140 | 3770 | 1.2 | $2.9 \times 10^6$ | −11.2 | 2.9 | −5.4 | −5.9 |
| 108 | 1100 | 3680 | 1.0 | $3.8 \times 10^6$ | −10.8 | 2.3 | −5.1 | −5.8 |
| 109 | 1110 | 3690 | 1.0 | $3.3 \times 10^6$ | −10.6 | 3.2 | −5.2 | −5.1 |
| 110 | 1110 | 3710 | 1.1 | $3.4 \times 10^6$ | −11.9 | 4.1 | −6.4 | −2.6 |
| 111 | 1250 | | | Not coherently bonded on firing | | | | |
| 112 | 1250 | | | " | | | | |
| 113 | 1250 | | | " | | | | |
| 114 | 1130 | 3730 | 1.0 | $4.3 \times 10^6$ | −8.9 | 3.2 | −4.2 | −4.7 |
| 115 | 1140 | 3690 | 1.0 | $4.8 \times 10^6$ | −9.1 | 2.0 | −4.6 | −5.3 |
| 116 | 1120 | 3720 | 1.2 | $3.5 \times 10^6$ | −10.7 | 2.2 | −5.3 | −6.0 |
| 117 | 1130 | 3770 | 1.1 | $4.9 \times 10^6$ | −8.5 | 2.0 | −5.4 | −5.6 |
| 118 | 1140 | 3650 | 1.2 | $4.0 \times 10^6$ | −10.2 | 3.4 | −6.3 | −6.5 |
| 119 | 1140 | 3830 | 1.1 | $4.5 \times 10^6$ | −9.9 | 4.0 | −4.9 | −6.8 |
| 120 | 1250 | | | Not coherently bonded on firing | | | | |
| 121 | 1160 | 4400 | 1.4 | $1.5 \times 10^6$ | −8.3 | 2.1 | −4.4 | −4.3 |
| 122 | 1140 | 4130 | 1.0 | $2.2 \times 10^6$ | −7.2 | 3.9 | −3.3 | −4.9 |
| 123 | 1130 | 3740 | 1.0 | $3.3 \times 10^6$ | −7.3 | −0.1 | −3.5 | −8.0 |

TABLE 4-continued

| | | Firing Temperature & Capacitor Characteristics | | | | | | |
|---|---|---|---|---|---|---|---|---|
| | | | | Capacitor Characteristics | | | | |
| Test No. | Firing Temp. (°C.) | Specific Dielectric Constant | Dielectric Loss (%) | Resistivity (megohm-cm) | Capacitance Variations (%) | | | |
| | | | | | At −55° C. | At 125° C. | At −25° C. | At 85° C. |
| 124 | 1070 | 3390 | 1.1 | $1.9 \times 10^6$ | −11.5 | −2.3 | −6.3 | −8.7 |
| 125 | 1040 | 2870 | 1.4 | $1.7 \times 10^6$ | −13.9 | −6.8 | −8.5 | −11.0 |

It will be noted from Table 4 that the specific dielectric constants of the Test No. 1 capacitors, for instance, averaged 3950, their dielectric losses 1.1 percent, their resistivities $7.0 \times 10^6$ megohm-centimeters, and their percent variations of capacitances from those at 25 degrees C. to those at −55 degrees and +125 degrees C., −10.8 and +3.0 percent, and from those at 20 degrees C. to those at −25 degrees and +85 degrees C., −5.6 and −6.0 percent, respectively.

Before proceeding further with the examination of Table 4, we will determine the criteria of acceptability for the four electrical properties in question of the capacitors as follows:
Specific dielectric constant, at least 3000.
Dielectric loss, not more than 2.5 percent.
Resistivity, at least $1 \times 10^6$ megohm-centimeters.
Temperature dependence of capacitance, within plus and minus 15 percent at −55 degrees and +125 degrees C., and within plus and minus 10 percent at −25 degrees and +85 degrees C.

A reconsideration of Table 4 in light of the above established criteria of favorable capacitor characteristics will reveal that the capacitors of Tests Nos. 11–16, 30, 35, 40, 41, 45, 46, 49, 50, 58–60, 62, 63, 67, 71, 83, 92, 93, 99, 100, 111–113, 120 and 125 do not meet these criteria. Accordingly, the corresponding ceramic compositions of Tables 1, 2 and 3 fall outside the scope of our invention. All the other test capacitors come up to these criteria even though they were sintered at temperatures of less than 1200 degrees C. in a reductive atmosphere.

Although Table 4 gives the percent variations of capacitances only at −55 degrees, +125 degrees, −25 degrees and +85 degrees C., we actually measured the capacitances at additional temperatures of 0 degrees, +20 degrees, +25 degrees, +40 degrees, +60 degrees and +105 degrees C. The capacitance variations of all the test capacitors in accordance with our invention were within plus and minus 10 percent in the temperature range of −25 degrees to +85 degrees C. and within plus and minus 15 percent in the temperature range of −55 degrees to +125 degrees C.

Now, let us study the ceramic compositions of Tables 1, 2 and 3, and the corresponding capacitor characteristics of Table 4 in more detail.

As for the major ingredient,

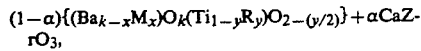

we tested various values for $\alpha$, k, x and y in order to determine desirable ranges of such values. First of all, the value of the x was set at zero in Tests Nos. 50 and 60. In the resulting capacitors the capacitance variation at −25 degrees C. was outside the desired range of plus and minus 10 percent, and the capacitance variation at −55 degrees C. was outside the desired range of plus and minus 15 percent. However, all the desired electrical characteristics were obtained when the value of the x was set at 0.01 as in Tests Nos. 51 and 52. Thus we set the lowest possible value of the x at 0.01.

The tests Nos. 58, 59, and 62 compositions had the value of the x set at 0.12. The capacitance variation of the resulting capacitors at +85 degrees C. fell outside the desired range of plus and minus 10 percent. All the desired electrical characteristics were obtained when the value of the x was set at 0.10 as in Tests Nos. 56, 57 and 61. The highest possible value of the x is therefore 0.10.

The capital M in the formula of the major ingredient represents either or both of Mg and Zn as aforesaid. The Tests indicate that the use of either or both of Mg and Zn does not substantially affect the characteristics of the resulting capacitors, and that the value of X can be in the range of 0.01 to 0.10 in either case.

The Tests Nos. 40, 71 and 83 compositions had the value of y set at 0.06. The dielectric bodies formulated accordingly were not coherently bonded on firing. All the desired electrical characteristics were obtained when the value of y was set at 0.04 as in Tests Nos. 39 and 70. The highest possible value of y is therefore 0.04.

The capital R in the formula of the major ingredient represents at least one rare earth element selected from Sc, Y, Gd, Dy, Ho, Er, Yb, Tb, Tm and Lu as aforesaid. The Tests indicate that the use of one or plural of the rare earth elements does not substantially affect the characteristics of the resulting capacitors, and that the value of y can be in the range zero to 0.04.

The addition of the rare earth elements to the major ingredient improves the temperature dependence of capacitance. The rare earth elements serve to make the capacitors that the capacitance variation is from −15 percent to +15 percent in a temperature range of −55 degrees to +125 degrees C., and form −10 percent to +10 percent in a temperature range of −25 degrees to +85 degrees C. Also, the rare earth elements serve to make the dielectric bodies with a high resistivity. Furthermore, the rare earth elements serve to make the ceramic bodies having higher coherency.

The value of $\alpha$ in the formula of the major ingredient was set at zero in Tests Nos. 41 and 46. The capacitance variations of the resulting capacitors fell outside the desired range of plus and minus 10 percent at −25 degrees C. and the desired range of plus and minus 15 percent at −55 degrees C. All the desired characteristics were met when the value of $\alpha$ was set at 0.005 as in Tests Nos. 42 and 47. The lowest possible value of $\alpha$ is therefore 0.005.

The value 0.05 chosen for $\alpha$ in Tests 45 and 49 was too high because the capacitance variations of the resulting capacitors at 85 degrees C. fell outside the desired range of plus and minus 10 percent. All the desired characteristics were achieved when the value of $\alpha$ was set at 0.04 as in Tests Nos. 44 and 48. The highest possible value of $\alpha$ is therefor 0.04.

When the value of K was set at 0.98 as in Test No. 63, the resistivities of the resulting capacitors were less than $1 \times 10^6$ megohm-centimeters. The capacitor characteristics were all satisfactory when the value of K was set at 1.00 at in Test No. 64. The lowest possible value of K is therefore 1.00.

When the value of K was set at 1.07 as in Test No. 67, the resulting dielectric bodies were not coherently bonded on firing. Coherently bonded ceramic bodies were obtained, and the capacitor characteristics were all satisfactory, when the value of K was set at 1.05 as in Test No. 66. The upper limit of the possible values of K is therefore 1.05.

The Tests Nos. 91 and 99 ceramic compositions contained as much as three parts by weight of the first additive ingredient ($Cr_2O_3/Al_2O_3$) with respect to 100 parts by weight of the major ingredient. The dielectric bodies formulated accordingly were not coherently bonded on firing at a temperature as high as 1250 degrees C. The ceramic compositions of Tests Nos. 90 and 98 contained 3.00 part by weight of the first additive ingredient with respect to 100 parts by weight of major ingerdient. They possessed the desired electrical characteristics. We set, therefore, the upper limit of the possible proportions of the first additive ingredient at three parts by weight with respect to 100 parts by weight of the major ingredient.

The first additive ingredient is either or both of $Cr_2O_3$ and $Al_2O_3$ as aforesaid. The Tests indicate that the use of either or both of $Cr_2O_3$ and $Al_2O_3$ does not substnatially affect the characteristics of the resulting capacitors, and that the weight part of the first additive ingredient can be in the range of 0.00 to 3.0, preferably 0.001 to 3.000, more preferably 0.01 to 3.00, in the either case.

The addition of the first additive ingredient ($Cr_2O_3/Al_2O_3$) to the compositions improves the temperature dependence of capacitance. The first additive ingredient serves to make the capacitors that the capacitance variation is from $-15\%$ to $+15\%$ in a temperature range of $-55$ degrees to $+125$ degrees C., and from $-10\%$ to $+10\%$ in a temperature range of $-25$ degrees to $+85$ degrees C. Also, the first additive ingredient serves to make the dielectric bodies with a high resistivity.

The ceramic compositions of Test No. 30 contained no the second additive ingredient specified by our invention. The dielectric bodies formulated accordingly were not coherently bonded on firing at a temperature as high as 1250 degrees C. For comparision the ceramic compositions of Test No. 31 contained 0.2 part by weight of the second additive ingredient with respect to 100 parts by weight of the major ingredient. Even though the firing temperatures for these test capacitors were as low as 1180 degrees C., they possessed the desired electrical characteristics. We set, therefore, the lower limit of the possible proportions of the second additive ingredient at 0.2 part by weight with respect to 100 parts by weight of the major ingredient.

The test No. 35 ceramic compositions contained 7 parts by weight of the second additive ingredient with respect to 100 parts by weight of the major ingredient. The specific dielectric constants of the resulting capacitors were less than the above established criterion of 3000. Also, their capacitance variations were outside the range of plus and minus 10 percent at 85 degrees C., and the range of plus and minus 15 percent at $-55$ degrees C. However, when the proportion of the second additive ingredient was reduced to five parts by weight as in Tests Nos. 34 and 52, the resulting capacitors has all the desired electrical characteristics. Accordingly, the upper limit of the possible proportions of the second additive ingredient is set at five parts by weight with respect to 100 parts by weight of the major ingredient.

Figure 2:
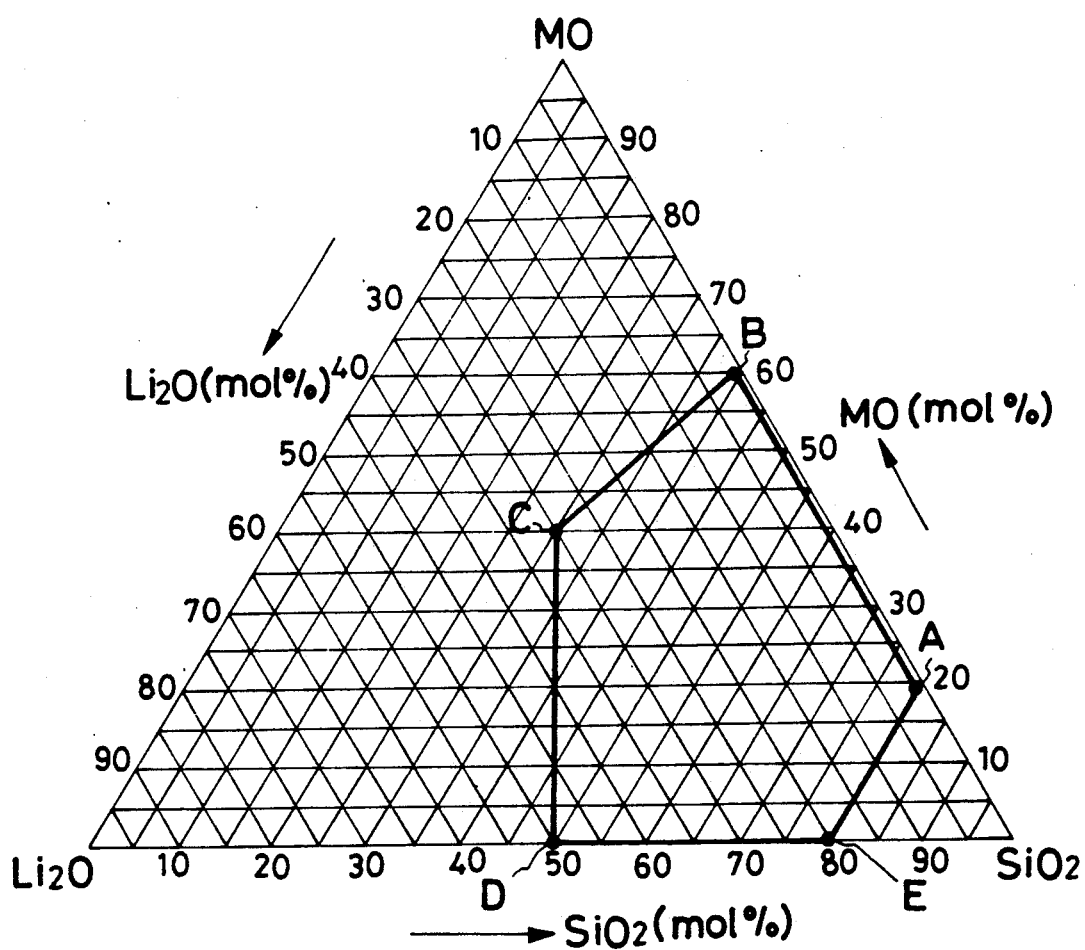
FIG. 2 is a ternary diagram depicting the relative proportions of the second additives of the ceramic compositions in accordance with Examples 1-100 of our invention.

We have ascertained from the results of the Tests Nos. 1-16 that the acceptable range of the relative proportions of $Li_2O$, $SiO_2$ and MO, the second additive ingredient of the ceramic compositions in accordance with our invention, can be definitely stated in reference to the ternary diagram of FIG. 2. The point A in the ternary diagram indicates the Test No. 1 additive composition of one mole percent $Li_2O$, 80 mole percent $SiO_2$, and 19 mole percent MO. The point B indicates the Test No. 2 additive composition of one mole percent $Li_2O$, 39 mole percent $SiO_2$, and 60 mole percent MO. The point C indicates the Test No. 3 additive composition of 30 mole percent $Li_2O$, 30 mole percent $SiO_2$, and 40 mole percent MO. The point D indicates the Test No. 4 additive composition of 50 mole percent $Li_2O$, 50 mole percent $SiO_2$, and 0 mole percent MO. The point E indecated the Test No. 5 additive composition of 20 mole percent $Li_2O$, 80 mole percent $SiO_2$, and 0 mole percent MO.

The relative proportions of the additives $Li_2O$, $SiO_2$, and MO of the ceramic compositions in accordance with our invention are within the region bounded by the lines sequentially connecting the above defined points A, B, C, D and E in the ternary diagram of FIG. 2.

Tables 1, 2, 3 and 4 prove that the second additive compositions within the above defined region makes possible the provision of capacitors of the desired characteristics. The second additive compositions of Tests Nos. 11-16 all fall outside that region, and the corresponding dielectric bodies were not coherently bonded on firing at a temperature of as high as 1250 degrees C. The above specified acceptable range of the relative proportions of the second additives holds true regardless of whether only one of BaO, MgO, ZnO, SrO and CaO is employed as MO, as in Tests Nos. 17-21, or two or more or all of them are employed as in the other Tests.

Figure 3:
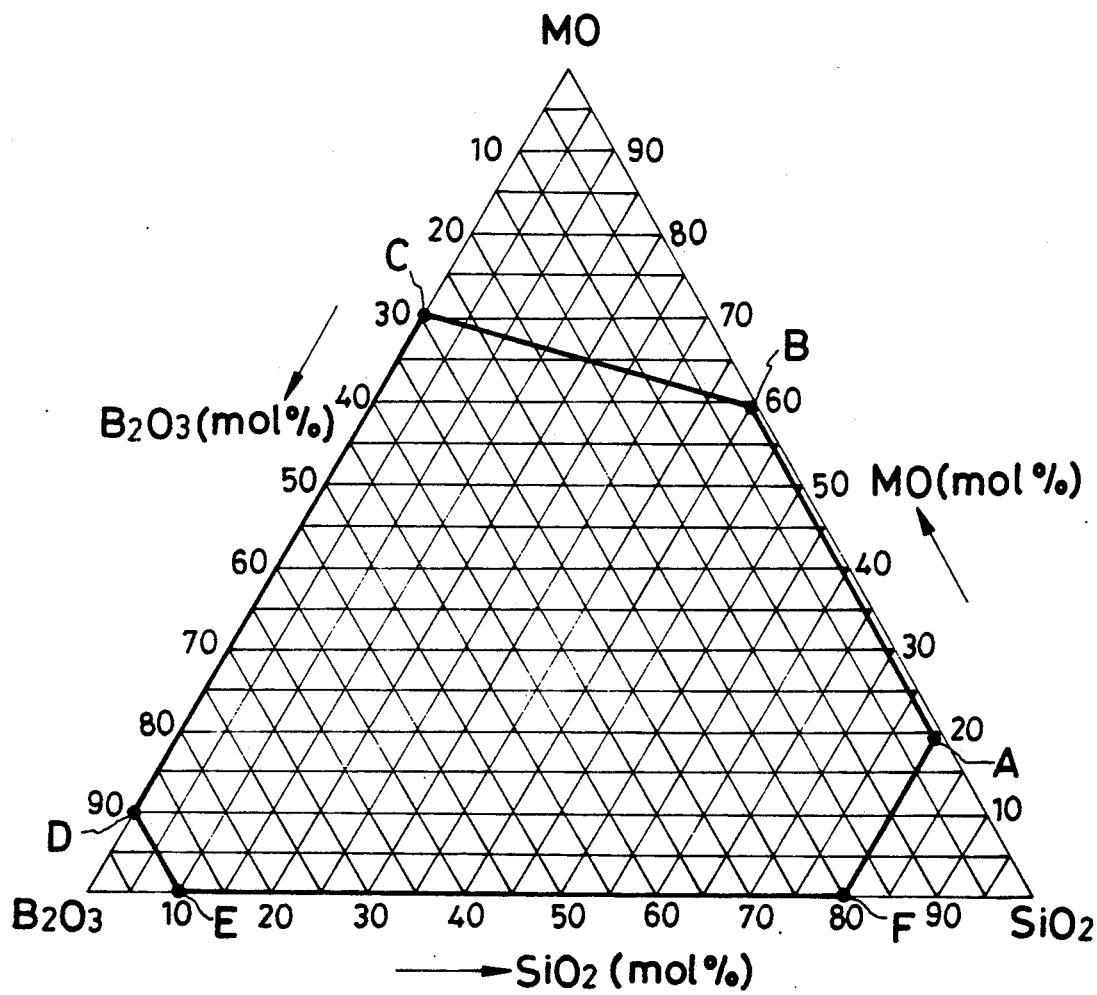
FIG. 3 is a ternary diagram depicting the relative proportions of the second additives of the ceramic compositions in accordance with Examples 101-125 of our invention.

Also, we have ascertained from the results of the Tests Nos. 101-125 that the acceptable range of the relative proportions of $B_2O_3$, $SiO_2$ and MO, the second additive ingredient of the ceramic compositions in accordance with our invention, can be definitely stated in reference to the ternary diagram of FIG. 3. The point A in the ternary diagram indicates the Test No. 101 additive composition of one mole percent $B_2O_3$, 80 mole percent $SiO_2$, and 19 mole percent MO. The point B indicates the Test No. 102 additive composition of one mole percent $B_2O_3$, 39 mole percent $SiO_2$, and 60 mole percent MO. The point C indicates the Test No. 103 additive composition of 30 mole percent $B_2O_3$, 0 mole percent $SiO_2$, and 70 mole percent MO. The point D indicates the Test No. 104 additive composition of 90 mole percent $B_2O_3$, 0 mole percent $SiO_2$, and 10 mole percent MO. The point E indicates the Test No. 105 additive composition of 90 mole percent $B_2O_3$, 10 mole percent $SiO_2$, and 0 mole percent MO. The point F indicates the Test No. 106 additive composition of 20 mole percent $B_2O_3$, 80 mole percent $SiO_2$, and 0 mole percent MO.

The relative proportions of the additives $B_2O_3$, $SiO_2$ and MO of the ceramic compositions in accordance with our invention are within the region bounded by the lines sequentially connecting the above defined points A, B, C, D, E and F in the ternary diagram of FIG. 3.

Tables 1, 2, 3 and 4 prove that the second additive compositions within the above defined region makes possible the provision of capacitors of the desired characteristics. The second additive compositions of Tests Nos. 111-113 all fall outside that region, and the corresponding dielectric bodies were not coherently bonded on firing at a temperature of as high as 1250 degrees C. The above specified acceptable range of the relative proportions of the second additives holds true regardless of whether only one of BaO, MgO, ZnO, SrO and CaO is employed as MO, as in Tests Nos. 114-118, or two or more or all of them are employed as in the other Tests.

Although we have disclosed our invention in terms of specific Examples thereof, we understand that our invention is not to be limited by the exact details of such disclosure but admits of a variety of modifications or alterations within the usual knowledge of the ceramists, chemists or electricians without departing from the scope of the invention. The following, then, is a brief list of such possible modifications or alterations:

1. The low temperature sinterable ceramic compositions of our invention may contain various additives other than those disclosed herein. An example is a mineralizer such as manganese dioxide. Used in a proportion (preferably from 0.05 to 0.10 percent by weight) not adversely affecting the desired characteristics of the resulting capacitors, the mineralizer will serve to improve the sinterability of the ceramic compositions.

2. The start materials of the ceramic compositions in accordance with our invention may be substances such as oxides or hydroxides other than those employed in the foregoing Examples.

3. The temperature of the oxidizing heat treatment need not necessarily be 600 degrees C. but can be variously determined in a range (from 500 degrees to 1000 degrees C. for the best results) not exceeding the temperature of the preceding sintering in a nonoxidative atmosphere, the oxidizing temperature being dependent upon factors such as the paticular base metal electrode material in use and the degree of oxidation required for each ceramic material to be produced.

4. The temperature of cosintering in a nonoxidative atmosphere may also be changed in consideration of the particular electrode material in use. We recommend a range of 1050 degrees to 1200 degrees C. if the electrode material is nickel, as we have ascertained by experiment that little or no flocculation of the nickel particles takes place in that temperature range.

5. The dielectric bodies formulated in accordance with our invention, with or without electrodes buried therein or otherwise attached thereto, may be sintered in a neutral, instead of reductive, atmosphere.

6. The principles of our invention may be applied to capacitors other than those of the monolithic, multilayered configuration disclosed herein.

What we claimed is:

1. A solid dielectric capacitor comprising a dielectric ceramic body and at least two electrodes in contact therewith, the dielectric ceramic body consisting essentially of:

(a) 100 parts by weight of a major ingredient expressed by the formula,

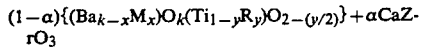

where
M is either or both of magnesium and zinc;
R is at least one metal selected from scandium, yttrium, gadolinium, dysprosium, holmium, erbium, ytterbium, terbium, thulium and lutetium;
$\alpha$ is a numeral in the range of 0.005 to 0.040;
k is a numeral in the range of 1.00 to 1.05;
x is a numeral in the range of 0.01 to 0.10; and
y is a numeral greater than 0 and not greater than 0.04;

(b) greater than 0 and not greater than 3.00 parts by weight of at least either of chromium oxide and aluminum oxide; and (c) from 0.2 to 5.0 parts by weight of an additive mixture of at least two members selected from the group consisting of boric oxide or lithium oxide, silicon oxide and at least one metal oxide selected form the group consisting of barium oxide, strontium oxide, calcium oxide, magnesium oxide and zinc oxide.

2. The solid dielectric capacitor of claim 1 wherein the additive mixture is an additive mixture of lithium oxide, silicon dioxide and at least one metal oxide selected from the group consisting of barium oxide, strontium oxide, calcium oxide, magnesium oxide and zinc oxide, the relative proportions of lithium oxide, silicon dioxide and at least one selected metal oxide constituting the additive mixture being in that region of the ternary diagram of FIG. 2 attached hereto which is bounded by lines sequentially connecting:

the point A where the additive mixture consists of one mole percent lithium oxide, 80 mole percent silicon dioxide, and 19 mole percent metal oxide;

the point B where the additive mixture consists of one mole percent lithium oxide, 39 mole percent silicon dioxide, and 60 mole percent metal oxide;

the point C where the additive mixture consists of 30 mole percent lithium oxide, 30 mole percent silicon dioxide, and 40 mole percent metal oxide;

the point D where the additive mixture consists of 50 mole percent lithium oxide, 50 mole percent silicon dioxide, and 0 mole percent metal oxide; and the point E where the additive mixture consists of 20 mole percent boric oxide, 80 mole percent silicon dioxide, and 0 mole percent metal oxide.

3. The solid dielectric capacitor of claim 1 wherein the additive mixture is an additive mixture of boric oxide, silicon dioxide and at least one metal oxide selected from the group consisting of barium oxide, strontium oxide, calcium oxide, magnesium oxide and zinc oxide, the relative proportions of boric oxide, silicon dioxide and at least one selected metal oxide constituting the additive mixture being in that region of the ternary diagram of FIG. 3 attached hereto which is bounded by lines sequentially connecting:

the point A where the additive mixture consists of one mole percent boric oxide, 80 mole percent silicon dioxide, and 19 mole percent metal oxide;

the point B where the additive mixture consists of one mole percent boric oxide, 39 mole percent silicon dioxide, and 60 mole percent metal oxide;

the point C where the additive mixture consists of 30 mole percent boric oxide, 0 mole percent silicon dioxide, and 70 mole percent metal oxide;

the point D where the additive mixture consists of 90 mole percent boric oxide, 0 mole percent silicon dioxide, and 10 mole percent metal oxide;

the point E where the additive mixture consists of 90 mole percent boric oxide, 10 mole percent silicon dioxide, and 0 mole percent metal oxide; and the point F where the additive mixture consists of 20 mole percent boric oxide, 80 mole percent silicon dioxide, and 0 mole percent metal oxide.

4. The solid dielectric capacitor of claims 1, 2 or 3 wherein the electrodes are buried in the dielectric ceramic body.

5. The solid dielectric capacitor of claims 1, 2 or 3 wherein the electrodes are of a base metal.

6. The solid dielectric capacitor of claim 5 wherein the base metal is nickel.

7. A process for the manufacture of a solid dielectric capacitor which comprises:
(a) providing in finely divided form a mixture of: 100 parts by weight of a major ingredient expressed by the formula,

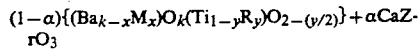

where
M is either or both of magnesium and zinc;
R is at least one metal selected from scandium, yttrium, gadolinium, dysprosium, holmium, erbium, ytterbium, terbium, thulium and lutetium;
$\alpha$ is a numeral in the range of 0.005 to 0.040;
$k$ is a numeral in the range of 1.00 to 1.05;
$x$ is a numeral in the range of 0.01 to 0.10; and
$y$ is a numeral greater than 0 and not greater than 0.04;
greater than 0 and not greater that 3.00 parts by weight of at least either of chromium oxide and aluminum oxide; and from 0.2 to 5.0 parts by weight of an additive mixture of at least two members selected from the group consisting of boric oxide or lithium oxide, silicon oxide and at least one metal oxide selected form the group consisting of barium oxide, strontium oxide, calcium oxide, magnesium oxide and zinc oxide;
(b) molding the mixture into desired shape and size, the molding having at least two electrode portions of an electroconductive material;
(c) cosintering the molding and the electrode portions to maturity in a nonoxidative atmosphere; and
(d) heating the cosintered molding and electrode portions in an oxidative atmosphere.

8. The process of claim 7 wherein the electrode portions are formed on the molding by coating the same with an electroconductive paste composed principally of a base metal.

9. The process of claim 8 wherein the base metal is nickel.

10. The process of claim 7 wherein the molding and the electrode portions are cosintered in a temperature range of 1050 degrees to 1200 degrees C.

11. The process of claim 7 wherein the cosintered molding and electrode portions are heated in a temperature range of 500 degrees to 1000 degrees C.

* * * * *